United States Patent
Mihara et al.

(10) Patent No.: US 9,019,528 B2
(45) Date of Patent: Apr. 28, 2015

(54) RESTRICTING A SCREEN TRANSITION INSTRUCTION BASED ON A STATUS OF EXECUTION OF A JOB INSTRUCTED BY A WEB SERVER

(75) Inventors: Makoto Mihara, Yokohama (JP); Nobuaki Fukasawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 224 days.

(21) Appl. No.: 13/058,160

(22) PCT Filed: Dec. 1, 2010

(86) PCT No.: PCT/JP2010/071944
§ 371 (c)(1),
(2), (4) Date: Feb. 8, 2011

(87) PCT Pub. No.: WO2011/071053
PCT Pub. Date: Jun. 16, 2011

(65) Prior Publication Data
US 2011/0261398 A1     Oct. 27, 2011

(30) Foreign Application Priority Data

Dec. 11, 2009  (JP) .................................. 2009-282223
Sep. 16, 2010  (JP) .................................. 2010-208434

(51) Int. Cl.
*G06F 3/12*     (2006.01)
*H04N 1/00*     (2006.01)

(52) U.S. Cl.
CPC ............ *H04N 1/00464* (2013.01); *G06F 3/121* (2013.01); *G06F 3/122* (2013.01); *G06F 3/1259* (2013.01); *G06F 3/126* (2013.01);

(Continued)

(58) Field of Classification Search
CPC .................................................. H04N 1/00464
USPC ............... 358/1.13, 1.14, 1.15; 345/204, 214; 715/726, 788
See application file for complete search history.

(56) References Cited

U.S. PATENT DOCUMENTS

| 7,058,705 B1 | 6/2006 | Fukasawa |
| 7,650,399 B2 | 1/2010 | Fukasawa |

(Continued)

FOREIGN PATENT DOCUMENTS

| JP | 2008-3833 | 1/2008 |
| JP | 2008-186065 | 8/2008 |

(Continued)

OTHER PUBLICATIONS

European Search Report dated Jun. 11, 2013 issued during prosecution of related European application No. 10835973.8.

Primary Examiner — Jacky X Zheng
(74) Attorney, Agent, or Firm — Fitzpatrick, Cella, Harper & Scinto

(57) ABSTRACT

With an information processing apparatus, if a user operates a "back" button of a web browser while a job is being executed, a script for controlling the job currently being executed is lost, and the job can no longer be controlled. An information processing apparatus of the present invention can communicate with a web server, and includes a web browser that displays an operation screen provided by the web server. This information processing apparatus manages the status of a job to be executed, and restricts acceptance of an instruction for screen transition from the user according to the managed status of the job while the job instructed by the web server is being executed.

10 Claims, 17 Drawing Sheets

(52) U.S. Cl.
CPC ............ *G06F 3/1271* (2013.01); *G06F 3/1285* (2013.01); *H04N 1/00474* (2013.01); *H04N 1/00925* (2013.01); *H04N 2201/0094* (2013.01)

(56) References Cited

U.S. PATENT DOCUMENTS

| | | | |
|---|---|---|---|
| 8,120,793 B2 | 2/2012 | Lovat | |
| 2003/0135587 A1* | 7/2003 | Fisher et al. | 709/219 |
| 2006/0077428 A1* | 4/2006 | Lovat et al. | 358/1.15 |
| 2006/0250645 A1* | 11/2006 | Miyazaki | 358/1.15 |
| 2006/0262349 A1* | 11/2006 | Moroi | 358/1.15 |
| 2008/0256630 A1 | 10/2008 | Fujikawa | |
| 2011/0035785 A1 | 2/2011 | Mihara | |

FOREIGN PATENT DOCUMENTS

| | | |
|---|---|---|
| JP | 2008186065 A * | 8/2008 |
| JP | 2009-251668 | 10/2009 |

* cited by examiner

F I G. 1
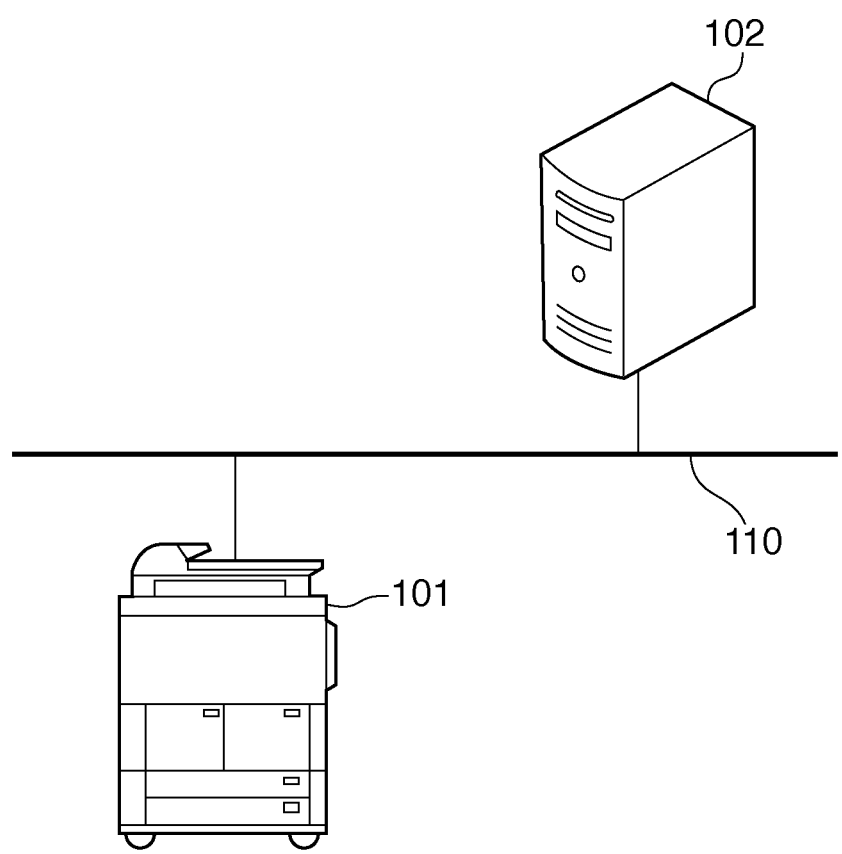

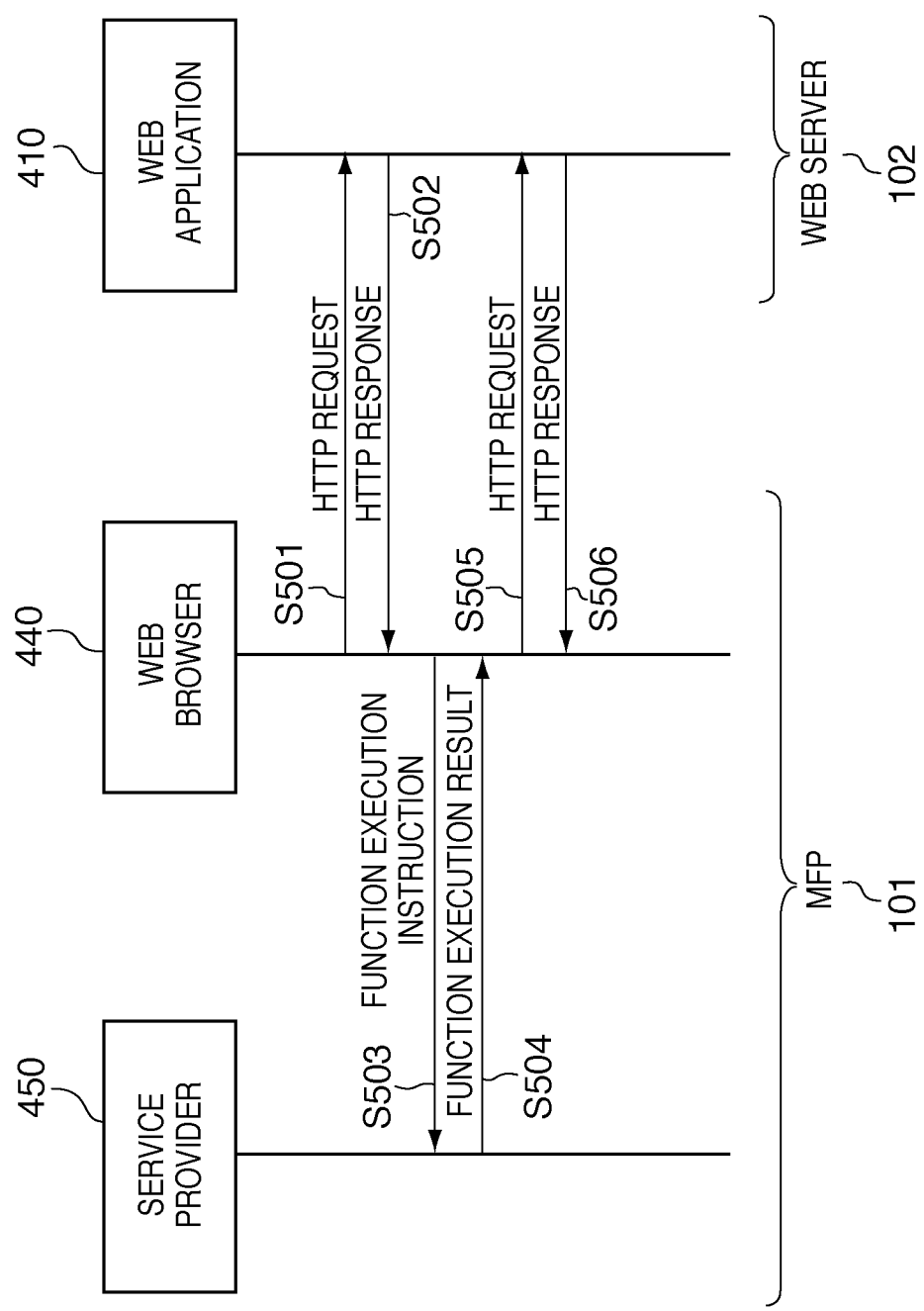

FIG. 7

```
<html>
<head>
<script language="JavaScript">
    ocalhost/ws/scantoftpservice" ;
var ftpserver="ftp://server/" ;
var ftppath="0000001" ;

function invoke_ws_scantoftp(filename,format)
{
  var param=new Array;
  params[0]=SoapParameter("string",filename);
  params[1]=SoapParameter("string",format);
  params[2]=SoapParameter("string",ftpserver);
  params[3]=SoapParameter("string",ftppath);
  var message=create_sorp_message(endpoint"execute",params);
  var job_id=send_soap_message(message);
  return job_id;
} function execute_scan()
{
  var filename=document.getElementsByName("filename").item(0).value ;
  var format=document.getElementsByName("format").item(0).value ;

var job_id=invoke_ws_scantoftp(filename,format);
  document.Next.jobid.value=job_id;
  document.Next.submit();
}
</script>
</head>
<body>

<h1>■ SCAN AND SEND TO FTP SERVER</h1>
<h2> ■ PLEASE SET THE ORIGINAL AND PRESS THE EXECUTION BUTTON.</h2>
<form>
<table border="3"><tr><td>
  <p>FILENAME
    <input type="text"name="filename"></br>
  </p>
  <p>IMAGE FORMAT
    <input type="radio"name="format"value="pdf">PDF
    <input type="radio"name="format"value="JPEG">JPEG</br>
  </p>
</td></tr></table>
    <input type="submit"name="execute"onclick="execute_scan();">
</form>

<form name"Next"method="post"action="processing.aspx">
  <input type"hidden"name="jobid">
</form>

</body>
</html>
```

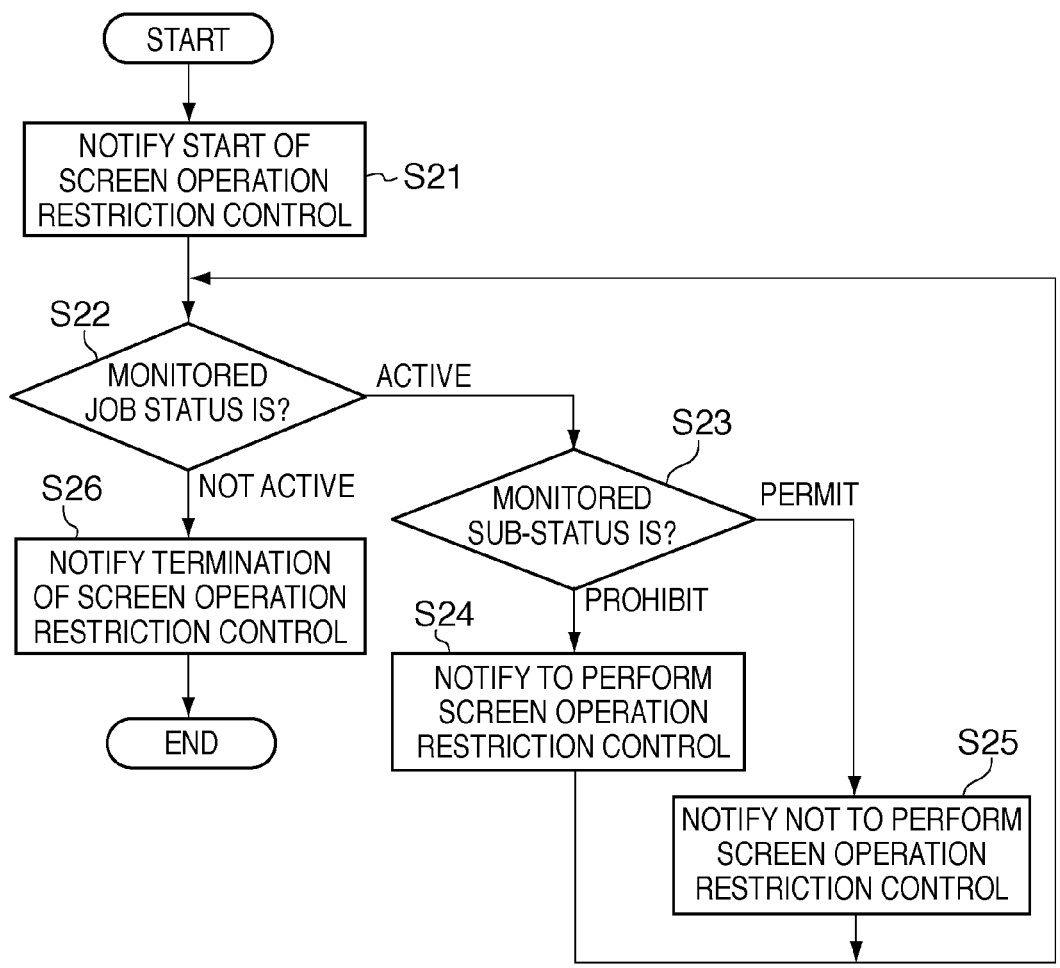

RESTRICTING A SCREEN TRANSITION INSTRUCTION BASED ON A STATUS OF EXECUTION OF A JOB INSTRUCTED BY A WEB SERVER

This application is a National Stage application under 35 U.S.C. §371 of International Application No. PCT/JP2010/071944, filed on Dec. 1, 2010, which claims priority to Japanese Application No. 2009-282223, filed Dec. 11, 2009, and Japanese Application No. 2010-208434, filed Sep. 16, 2010, the contents of each of the foregoing applications being incorporated by reference herein.

TECHNICAL FIELD

The present invention relates to an information processing apparatus that is capable of communicating with a web server and includes a web browser that displays an operation screen provided by the web server, a control method for the information processing apparatus, and a program therefor.

BACKGROUND ART

It is known to connect an information processing apparatus such as a PC to a web server on a network, and to display an operation screen provided by the web server via a web browser included in the information processing apparatus. In this case, the web browser of the information processing apparatus first requests the web server for an operation screen. Then, in response to the request from the information processing apparatus, a web application in the web server transmits, to the information processing apparatus as a response, HTML data for causing the web browser to display an operation screen. Accordingly, the web browser of the information processing apparatus analyzes the received HTML data, and displays the operation screen based on the description of the HTML data. Furthermore, if a user inputs an instruction via the operation screen displayed by the web browser, the web browser notifies the web server of the input instruction. Then, the web application in the web server that has received this notification executes processing in accordance with the input instruction.

Recently, some multifunction peripherals (MFPs) provided with a scanner or a printer include a web browser as described above. Such an MFP displays an operation screen provided by a web server via the web browser of the MFP using the procedure described above, and accepts various instructions from a user.

Further, Japanese Patent Laid-Open No. 2008-003833 discloses that a web server provides an operation screen for inputting instructions for utilizing functions that an MFP has, and a control script for controlling the MFP according to the operation. That is, a user of the MFP inputs an instruction to the MFP via the operation screen displayed via the web browser. Then, the control script is executed according to the input instruction. This control script requests the MFP to execute various processes in accordance with the content of the instruction input by the user. Then, the MFP that has received this request executes the requested processes. Accordingly, it is not necessary to hold in the MFP all the menu data for operating the MFP, and the menu data can also be easily changed in the web server.

As disclosed in Japanese Patent Laid-Open No. 2008-003833 described above, execution of processing is instructed using the control script loaded into the web browser based on the instruction input via the operation screen displayed by the web browser. Further, an MFP function to be executed by the control script is generated in the MFP device in the form of a job. The job generated in this way performs control of a scanner device or a printer device of the MFP, and also makes a request for interactive processing such as a request for a next input and a request for error improvement to the user. The control script receives the request for such processing, and further performs the next process. Thus, the MFP functions are controlled by interactive processing performed by the control script and jobs.

On the other hand, web browsers generally have a function of executing screen transition regardless of the state of content loaded into the web browser, such as "Back", "Forward", "Address Field", and "Favorites". However, the following are conceivable problems in the case where functions of the MFP are controlled by a control script loaded into the web browser of the MFP. That is, with a configuration such as that disclosed in Japanese Patent Laid-Open No. 2008-003833, if the user operates a "Back" button of the web browser or the like while the MFP is executing a job, the control script that is being executed by the web browser is interrupted, and the screen that is being displayed is switched. Consequently, the script for controlling the job that is currently being executed is lost, and the job can no longer be controlled. Furthermore, if jobs that are being executed stop due to waiting for a user input or an error state, jobs whose processing cannot be continued will be retained in the MFP.

SUMMARY OF INVENTION

The present invention has been conceived to solve the problems in the conventional technology described above, and provides a mechanism for avoiding the loss of control of a job that is being executed due to input of an instruction for screen transition while the job is being executed.

One aspect of the present invention provides an information processing apparatus that is capable of communicating with a web server and includes a web browser that displays an operation screen provided by the web server, the apparatus comprising: an acceptance means configured to accept an instruction for screen transition from a user; a processing means configured to execute a job instructed by the web server; a management means configured to manage a status of the job executed by the processing means; and a control means configured to restrict acceptance of an instruction by the accepting means, according to the status of the job managed by the management means.

Another aspect of the present invention provides a control method for an information processing apparatus that is capable of communicating with a web server and includes a web browser that displays an operation screen provided by the web server, the method comprising: accepting an instruction for screen transition from a user; executing a job instructed by the web server; managing a status of the job executed in the executing; and controlling to restrict acceptance of an instruction in the accepting according to the status of the job managed in the managing.

Still another aspect of the present invention provides a program for causing a computer to function as an information processing apparatus that is capable of communicating with a web server and includes a web browser that displays an operation screen provided by the web server, the apparatus comprising: an acceptance means configured to accept an instruction for screen transition from a user; a processing means configured to execute a job instructed by the web server; a management means configured to manage a status of the job executed by the processing means; and a control means configured to restrict acceptance of an instruction by the accepting means, according to the status of the job managed by the management means.

Yet another aspect of the present invention provides an information processing apparatus that is capable of communicating with a web server and includes a web browser that displays an operation screen provided by the web server, the apparatus comprising: an acceptance means configured to accept an instruction for screen transition from a user; a processing means configured to execute processing requested by the web server in response to an operation performed by the user using the operation screen displayed by the web browser; a determination means configured to determine whether a prohibition request indicating to prohibit the screen transition has been provided by the web server together with the operation screen; and a control means configured to restrict acceptance of an instruction by the acceptance means while the processing means is executing processing, if the determination means determines that the prohibition request has been provided.

Still yet another aspect of the present invention provides a control method for an information processing apparatus that is capable of communicating with a web server and includes a web browser that displays an operation screen provided by the web server, the method comprising: accepting an instruction for screen transition from a user; executing processing requested by the web server in response to an operation performed by the user using the operation screen displayed by the web browser; determining whether a prohibition request indicating to prohibit the screen transition has been provided by the web server together with the operation screen; and controlling to restrict acceptance of an instruction in the acceptance step while processing is being executed in the executing, if it is determined in the determination that the prohibition request has been provided.

Yet still another aspect of the present invention provides a program for causing a computer to function as an information processing apparatus that is capable of communicating with a web server and includes a web browser that displays an operation screen provided by the web server, the apparatus comprising: an acceptance means configured to accept an instruction for screen transition from a user; a processing means configured to execute processing requested by the web server in response to an operation performed by the user using the operation screen displayed by the web browser; a determination means configured to determine whether a prohibition request indicating to prohibit the screen transition has been provided by the web server together with the operation screen; and a control means configured to restrict acceptance of an instruction by the acceptance means while the processing means is executing processing, if the determination means determines that the prohibition request has been provided.

According to the present invention, it is possible to avoid losing control of a job that is being executed due to the inputting of an instruction for screen transition while the job is being executed. Accordingly, it is possible to avoid a partially processed job being retained in an information processing apparatus.

Further features of the present invention will become apparent from the following description of exemplary embodiments with reference to the attached drawings.

BRIEF DESCRIPTION OF DRAWINGS

FIG. 1 is a diagram of an overall information processing system according to embodiments of the present invention.

FIG. 5 is a sequence diagram showing the flow of processing in the information processing system.

FIG. 7 is a diagram showing an example of HTML data for displaying a screen and an example of a control script.

FIG. 12A is a diagram showing an example of status information of a job managed by the MFP according to Embodiment 3.

FIG. 12B is a flowchart illustrating processing according to the status of a job carried out by the job status management unit according to Embodiment 3.

DESCRIPTION OF EMBODIMENTS

Hereinafter, embodiments of the present invention will be described in detail with reference to the attached drawings. It should be noted that the embodiments below do not limit the present invention set forth in the claims and that not all of the combinations of features described in the embodiments are necessarily essential as means for attaining the objects of the invention.

Embodiments 1 to 5 will be described as embodiments according to the present invention. In Embodiment 1 described below, in the case where a job is executed by a control script processed by a browser of an MFP, even if a user performs a screen transition operation with respect to the browser while the job is being executed, screen transition due to that operation is suppressed (the user instruction is canceled). Accordingly, it is possible to prevent the job from being retained. In the following, aspects common to Embodiments 1 to 5 will be described first, and thereafter each of Embodiments 1 to 5 will be described.

FIG. 1 is a diagram of an overall information processing system according to embodiments of the present invention. An MFP 101 and a web server 102 are connected to a LAN 110 so as to be capable of communicating with each other. The MFP 101 displays an operation screen provided by the web server 102. Note that in the embodiments, the multifunction peripheral (MFP) 101 is described as an example of an information processing apparatus according to the present invention.

Figure 2:
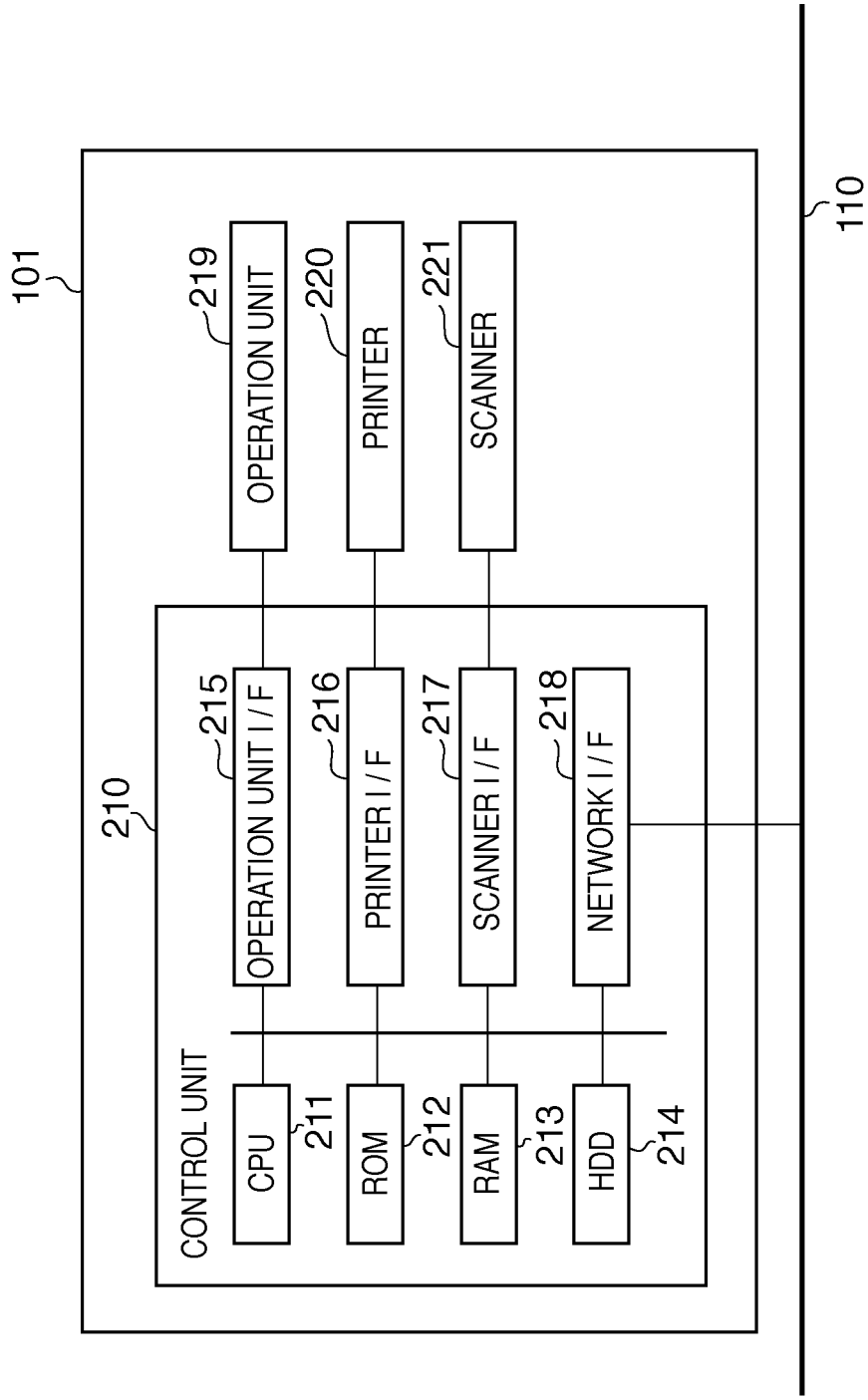
FIG. 2 is a block diagram showing the configuration of an MFP according to the embodiments of the present invention.

FIG. 2 is a block diagram showing the configuration of the MFP 101 according to the embodiments of the present invention. A control unit 210 including a CPU 211 controls the entire operation of the MFP 101. The CPU 211 reads out an OS and various application programs from an HDD 214 and stores them in a RAM 213, using a boot program stored in a ROM 212. The RAM 213 is used as a temporary storage area such as a main memory and a work area for the CPU 211. The HDD 214 stores image data, various programs, various information tables, and the like. An operation unit I/F 215 connects an operation unit 219 and the control unit 210. The operation unit 219 is provided with a liquid crystal display unit that has a touch-panel function, a keyboard, and the like. Further, the MFP 101 has a web browser function that will be described below, and the web browser of the MFP 101 analyzes HTML data received from the web server 102 and displays an operation screen based on the description of the received HTML data on the liquid crystal display unit of the operation unit 219. A printer I/F 216 connects a printer 220 and the control unit 210. Image data to be printed by the printer 220 is transferred from the control unit 210 via the printer I/F 216, and printed on a printing medium by the printer 220. A scanner I/F 217 connects a scanner 221 and the control unit 210. The scanner 221 reads an image on an original to generate image data, and inputs the generated image data to the control unit 210 via the scanner I/F 217. A network I/F 218 connects the control unit 210 (the MFP 101) to the LAN 110. The network I/F 218 transmits image data and information to an external apparatus (for example, the web server 102) on the LAN 110, and receives various information from the external apparatus on the LAN 110.

Figure 3:
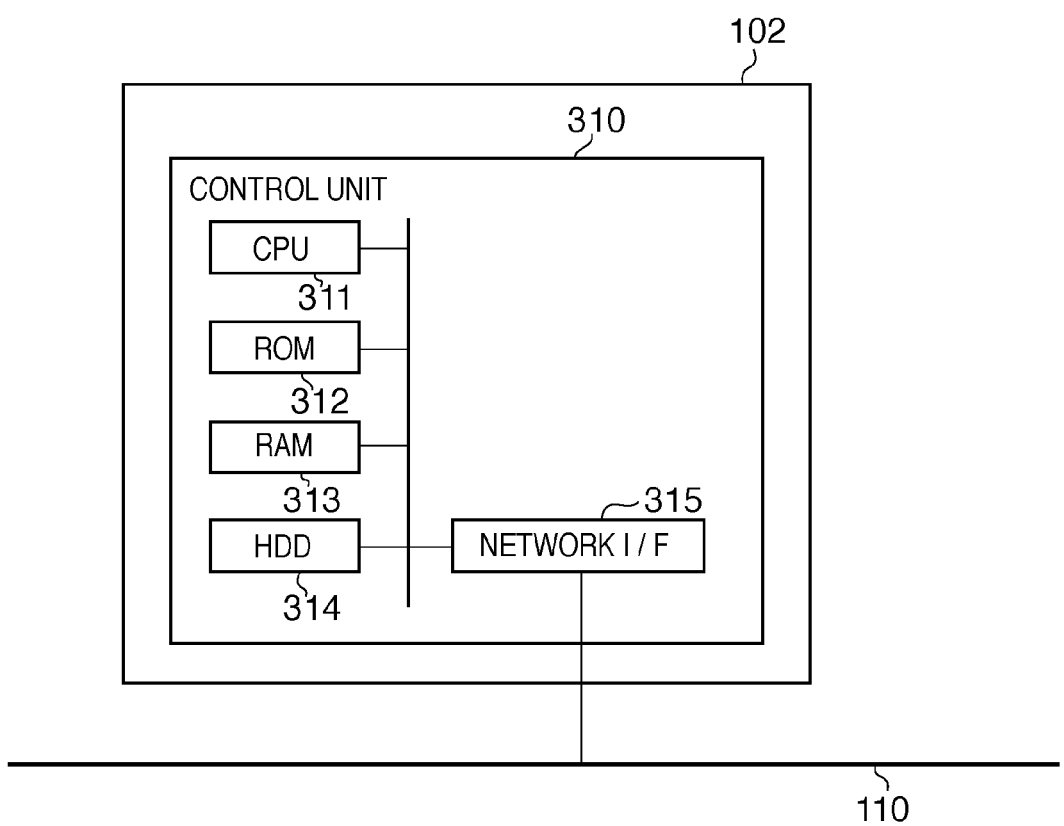
FIG. 3 is a block diagram showing the configuration of a web server according to the embodiments of the present invention.

FIG. 3 is a block diagram showing the configuration of the web server 102 according to the embodiments of the present invention. A control unit 310 including a CPU 311 controls the entire operation of the web server 102. The CPU 311 reads out an OS and various application programs from an HDD 314 and stores them in a RAM 313, using a boot program stored in a ROM 312. The RAM 313 is used as a temporary storage area such as a main memory and a work area for the CPU 311. The HDD 314 stores image data, various programs, various information tables, and the like. A network I/F 315 connects the control unit 310 (the web server 102) to the LAN 110. The network I/F 315 transmits and receives various information to/from other devices on the LAN 110.

Figure 4A:
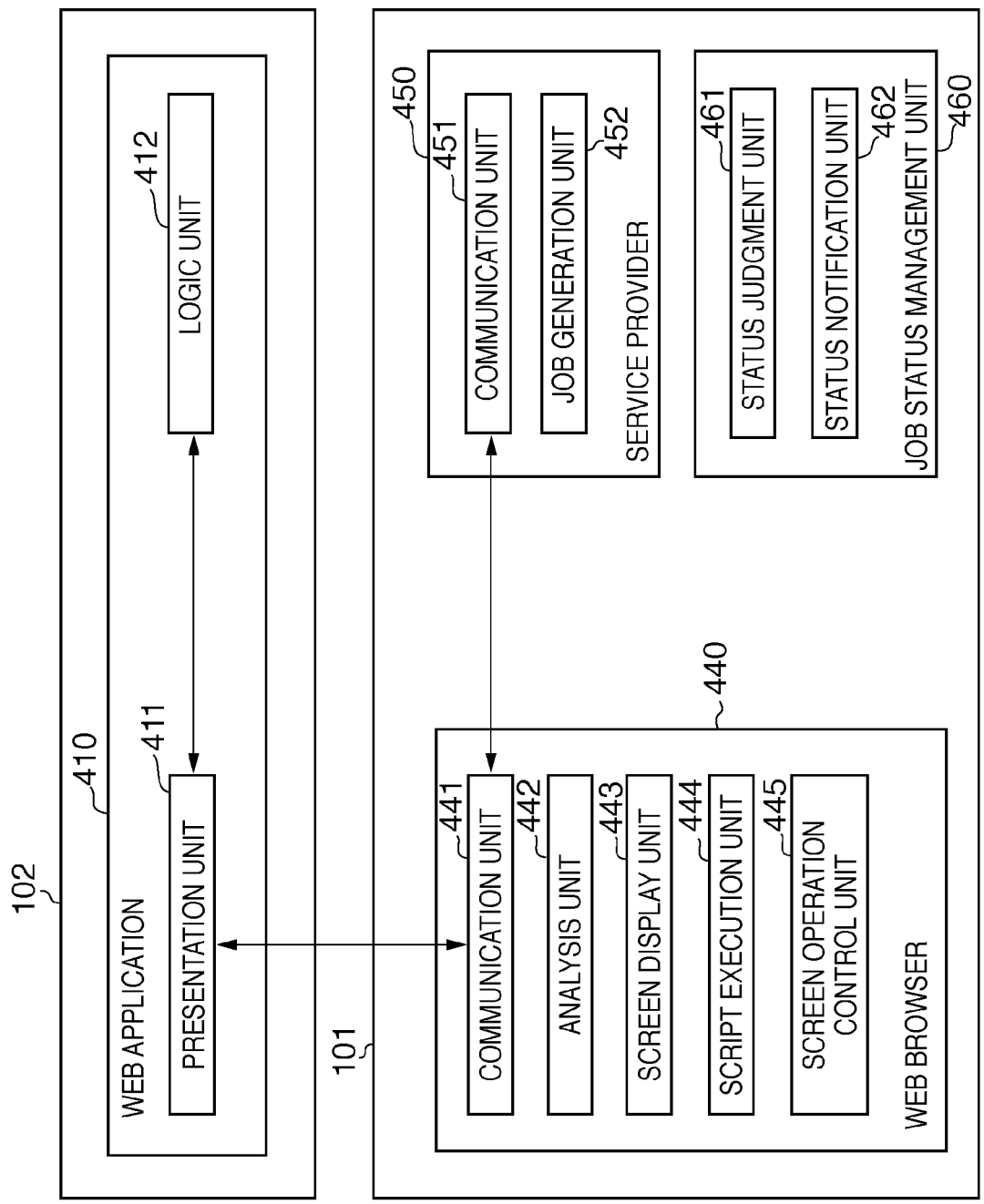
FIGS. 4A and 4B are diagrams illustrating the software configuration of the information processing system.

FIG. 4A is a diagram illustrating the software configuration of the information processing system according to the embodiments of the present invention. The functional units shown in FIG. 4A are realized by the CPU 211 and the CPU 311 included in the MFP 101 and the web server 102 respectively executing the programs loaded in the corresponding RAMs 213 and 313.

First, the software of the MFP 101 will be described. The software of the MFP 101 broadly includes a web browser 440, a service provider 450, and a job status management unit 460. The web browser 440 has a communication unit 441, an analysis unit 442, a screen display unit 443, a script execution unit 444, and a screen operation control unit 445. The communication unit 441 communicates with a presentation unit 411 included in a web application 410 of the web server 102 in accordance with the HTTP protocol. More specifically, the communication unit 441 requests the web application 410 for an operation screen to be displayed by the web browser 440. In this case, the communication unit 441 receives a response (processing result) transmitted from the web application 410. Further, the communication unit 441 transmits a function execution request to a communication unit 451 of the service provider 450. In this case, the communication unit 441 receives a response (processing result) transmitted from the service provider 450.

The analysis unit 442 analyzes the response received from the web application 410. HTML data and a control script are included in this response. The HTML data includes description indicating the content of an operation screen to be displayed by the web browser 440, and the control script includes description for controlling functions of the MFP 101. The screen display unit 443 displays an operation screen on the operation unit 219 based on the analysis result of the HTML data obtained by the analysis unit 442. The script execution unit 444 performs processing based on the analysis result of the control script obtained by the analysis unit 442. This control script includes code for giving instructions to the service provider 450 in order to control the function of the MFP 101, and code for processing such as updating a screen according to a response from the service provider 450. The screen operation control unit 445 controls the user interface with which the web browser 440 is provided. The control of the user interface includes processing such as enabling/disabling and displaying/hiding input buttons.

The service provider 450 has the communication unit 451 and a job generation unit 452. The communication unit 451 accepts a processing request from the communication unit 441 of the web browser 440. The job generation unit 452 receives the processing request accepted by the communication unit 451, and generates and executes a job for executing the requested processing.

The job status management unit 460 has a status judgment unit 461 and a status notification unit 462. The status judgment unit 461 judges the status of the job executed by the web browser 440, and carries out processing according to the status. When the status of the job changes, the status notification unit 462 notifies the screen operation control unit 445 of the web browser 440 of the changed status. Note that the job status management unit 460 may be included in the web browser 440, or may be included in the service provider 450.

Next, the software configuration of the web server 102 will be described. The web server 102 has the web application 410. The web application 410 is realized by the CPU 311 of the web server 102 executing the program loaded in the RAM 313.

The web application 410 receives information transmitted from the web browser 440 as a request, and executes processing based on the received information. The result of this processing is transmitted from the web application 410 to the web browser 440 as a response. The web application 410 has the presentation unit 411 and a logic unit 412. The presentation unit 411 communicates with the communication unit 441, and receives a request transmitted from the MFP 101. Next, the presentation unit 411 notifies the logic unit 412 of the request received from the MFP 101, and waits for a response from the logic unit 412. The presentation unit 411 that has received a response from the logic unit 412 transmits, to the communication unit 441 as a response, HTML data and a control script corresponding to an operation screen to be displayed by the web browser 440 of the MFP 101 in accordance with the content of the received response.

The logic unit 412 executes various processes according to the request notified from the presentation unit 411, and also generates HTML data of screen information to be displayed by the MFP 101, and a control script of the process to be executed by the MFP 101. Specifically, the logic unit 412 generates a control script for requesting the MFP 101 for execution of print processing performed by the printer 220, execution of reading processing performed by the scanner 221, or execution of transmission processing via the network I/F 218. In the case of requesting the MFP 101 to execute processing, the logic unit 412 delivers, to the presentation unit 411, HTML data and a control script to be transmitted to the MFP 101 as a response.

In the above, an outline of the system configuration according to the embodiments of the present invention has been described. Next is a description of an outline of the flow of system processing according to the embodiments of the present invention. FIG. 5 is a sequence diagram showing the flow of processing in the information processing system according to the embodiments of the present invention.

First, when the web browser 440 of the MFP 101 is started by the user, the web browser 440 transmits an HTTP request to the web application 410 in S501. The web application 410 that has received this request generates HTML data of a screen to be displayed by the web browser 440, and a control script to be executed by the web browser 440. Then, in S502, the web application 410 transmits a response to the web browser 440. For example, if the request in S501 is a request for a menu screen, HTML data for displaying a menu screen is transmitted to the web browser 440, and if it is a request for a scan execution screen, HTML data for displaying a scan screen and a control script for scan execution are transmitted thereto. Consequently, the web browser 440 analyzes the received HTML data in the analysis unit 442, and displays a screen. Further, when a control script is received, the web browser 440 analyzes the script in the analysis unit 442, and instructs the service provider 450 to execute the analyzed function in S503.

The service provider 450 executes the function in accordance with the content instructed in S503, and transmits the execution result of the function as a response to the web browser 440 in S504. The web browser 440 processes the received status based on the control script and carries out processing according to the status in S504. In the embodiments, the web browser 440 requests the web application 410 for HTTP again according to the status in S505. Here, for example, if the function execution result indicates the end of processing, a request for HTML data of a processing end screen is transmitted, and if it indicates a certain error, a request for HTML data of an error processing screen is transmitted.

The web application 410 generates HTML data of a screen and a control script according to the content of the request in S505. Then, in S506, the web application 410 transmits the data and script to the web browser 440 as a response. A series of processes for realizing the functions of the MFP 101 is carried out by repeating the above processing.

Figure 6:
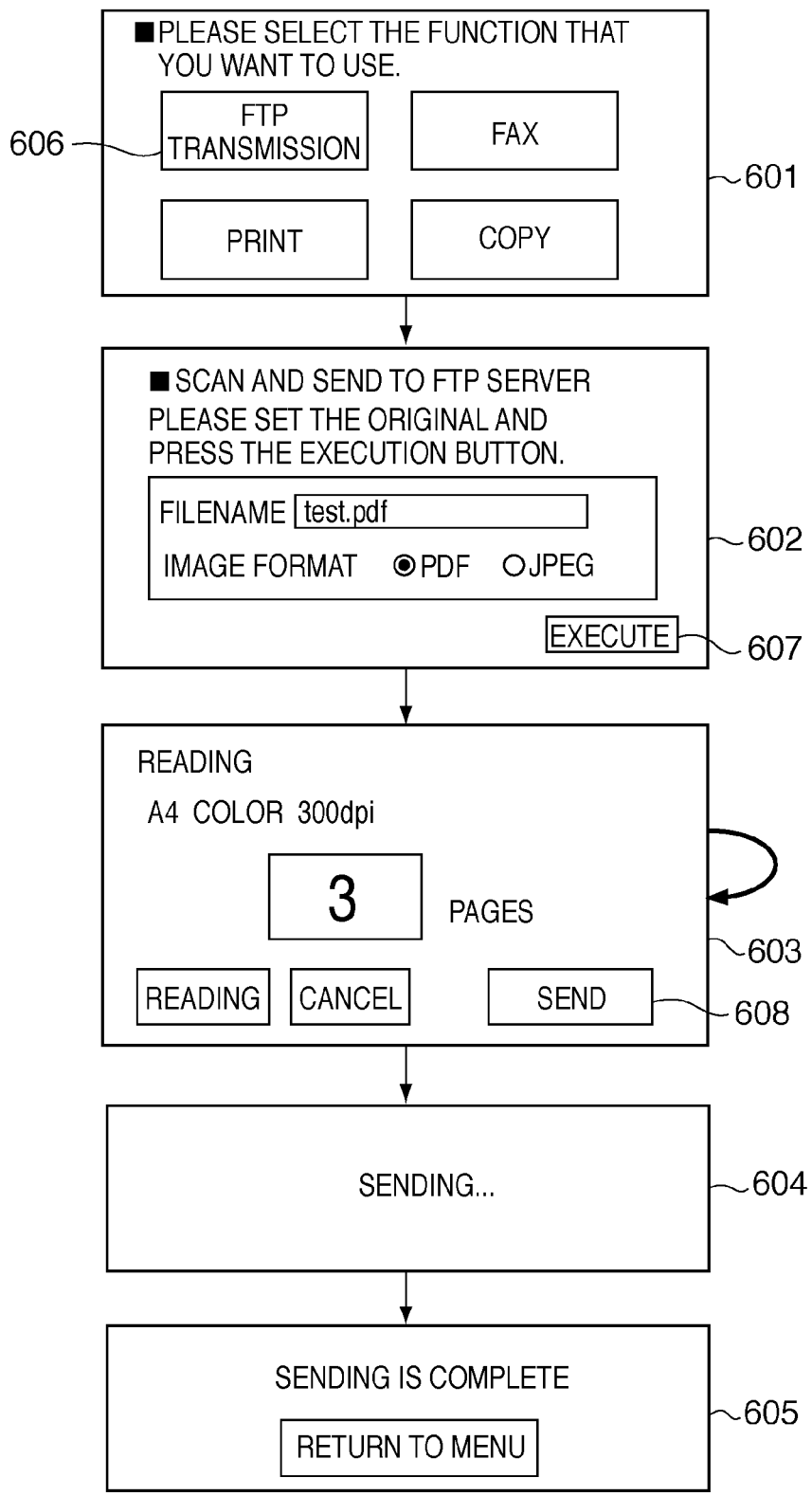
FIG. 6 is a diagram showing an example of screen transition that occurs in a series of processes in the information processing system.

FIG. 6 is a diagram showing an example of screen transition that occurs in a series of processes in the information processing system according to the embodiments. Here, screens are displayed in accordance with the progress of processing in the order of a menu screen 601, an FTP transmission setting screen 602, a scan screen 603, a transmission-in-progress screen 604, and a transmission complete screen 605. These screens are displayed by the web browser 440, and transition according to the user operation or the content of a control script. The menu screen 601 is a screen for the user to select a desired function to be executed by the MFP 101. If the user selects a function via this screen, the screen transitions to a screen corresponding to the selected function. The FTP transmission setting screen 602 shows a screen in the case where the user presses an FTP transmission button 606 on the menu screen 601 so as to select an FTP transmission function. The user instructs execution of the FTP transmission function by setting settings for FTP transmission on this screen 602. In the example in FIG. 6, settings are such that an original is scanned and read, the read image data is stored in PDF format, having a filename "test.pdf".

The scan screen 603 shows a screen in the case where the MFP 101 has started execution of the FTP transmission function by the user pressing an execution button 607 on the FTP transmission setting screen 602. On this screen 603, a control script controls a scan job, and thus controls original continuous reading of originals and the like. The transmission-in-progress screen 604 is displayed while image data obtained by scanning to read an original is actually being transmitted to an FTP server by the user pressing a send button 608 on the scan screen 603. The transmission complete screen 605 is displayed when transmission to the FTP server is complete.

FIG. 7 is a diagram showing an example of HTML data for displaying a screen and an example of a control script according to the embodiments. A control script and HTML data 701 shown in this example is information for configuring the FTP transmission setting screen 602. Further, the control script and HTML data 701 is dynamically generated by the web application 410 of the web server 102 in response to a request from the MFP 101. Below is a detailed description thereof.

In a block 702, some of the parameters for FTP transmission execution are set in the web application 410 of the web server 102. In an endpoint variable 706, URL information for giving a request for FTP transmission to the service provider 450 is set. In an ftpserver variable 707, the URL of the FTP server serving as a transmission destination of data is set. Further, in an ftppath variable 708, the path to the storage destination of the data in the FTP server is set.

In block 703, processing for actually invoking the service provider 450 for FTP transmission is described. In this example, an example in the case of invoking the service provider 450 utilizing SOAP (Simple Object Access Protocol) is shown. An invoke_ws_scantoftp function 709 is defined in this block. A SoapParameter function 710 is a function for generating parameters in the SOAP format. In this example, the name of a file to be transmitted via FTP, the format of the file, the transmission destination FTP server, and the storage destination path are set as "string" type data for this function. Here, the name of the file is "filename", the format of the file is "format", the transmission destination FTP server is "ftpserver", and the storage destination path is "ftppath".

Further, in a create_soap_message function 711, a SOAP message that instructs the endpoint to perform execution is generated. Furthermore, in a send_soap_message function 712, a SOAP request with respect to the service provider 450 is actually executed. At that time, an ID that uniquely identifies an FTP transmission job is returned to a job_id variable.

In a block 704, an execute_scan function 713 is defined, in which the process 714 for invoking the invoke_ws_scantoftp function 709 is described, with the parameters of the name of the file to be transmitted via FTP and the format of that file that have been input by the user. Furthermore, the process 715 gives an execution instruction that requests processing in order to obtain the data of a subsequent screen is described, with a parameter of a job ID obtained as an execution result of the invoke_ws_scantoftp function 709.

A block 705 indicates screen data to be displayed by the web browser 440. Here, in addition to the content to be displayed on the screen, a user input form 716 and a form 717 for making a request for HTTP data of the subsequent screen are defined. In the input form 716, it is defined that the name of a file to be transmitted via FTP can be input, that a file format thereof can be selected, and that the execute_scan function 713 is invoked by pressing the execution button. Further, when the processing 715 is performed by the processing in the block 704, the form 717 is executed. By executing this form 717, a POST request is made with the job ID set as a parameter with respect to processing.aspx.

Embodiment 1

In the above, an outline of the flow of processing in the system according to the embodiments of the present invention has been described. Next is a description of a specific example of processing for suppressing screen transition according to Embodiment 1 of the present invention.

Figure 8:
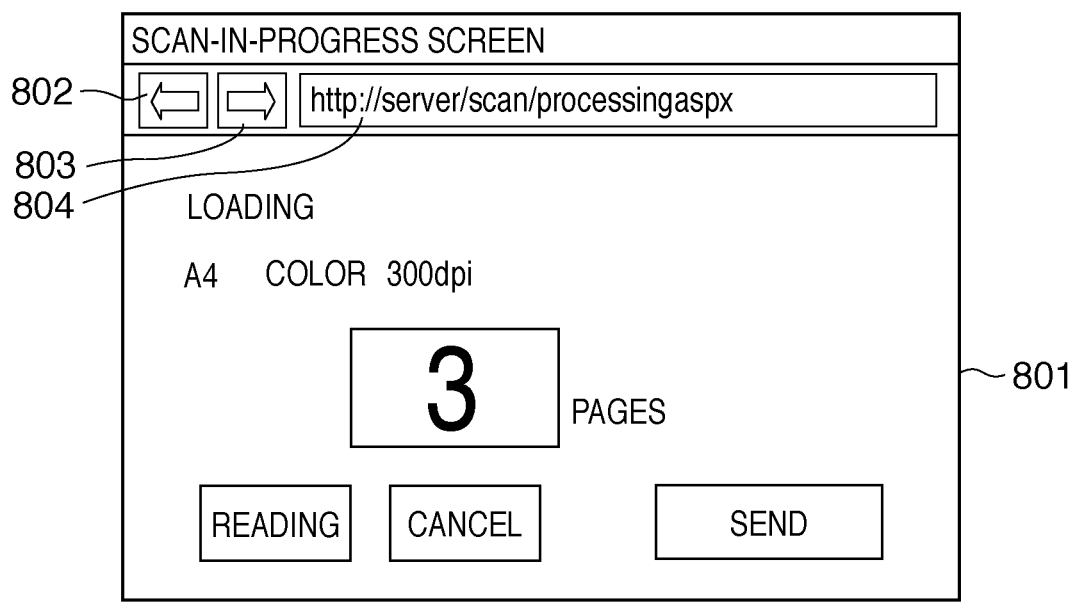
FIG. 8 is a diagram showing an example of a screen displayed by a web browser.

FIG. 8 is a diagram showing an example of a screen displayed by the web browser 440. A screen 801 is a screen displayed by the web browser 440 using received HTML data, and the web browser 440 displays the screen 801 as a screen for operating the MFP 101 in Embodiment 1. A back button 802 is a button for moving to the screen that was displayed just before the screen that is currently displayed. A forward button 803 is a button for returning again to the screen before switching if the screen currently displayed has been switched using the back button 802. An address field 804 displays a URL of the screen currently displayed. Further, it is possible to switch a screen by directly inputting a URL to the address field 804 and making an HTTP request to that URL. Ordinarily, the functions shown by 802 to 804 are independent of the screen 801, and thus can be operated any time. That is, if any of the back button 802, the forward button 803, and the address field 804 is operated while a job is being executed, a control script that is currently being executed stops, and the screen switches to another screen. Consequently, the job that has been partially processed can no longer be controlled.

Figure 9A:
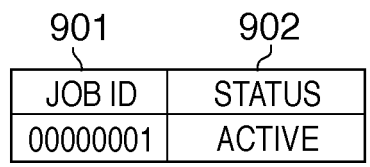
FIG. 9A is a diagram showing an example of status information of a job managed by the MFP.

FIG. 9A is a diagram showing an example of status information of a job managed by the job status management unit 460 of the MFP 101. A job ID 901 is issued, when a job is generated, as information that uniquely identifies the job. A status 902 indicates the current status of the job identified by the job ID 901. With regard to that job, the following is recorded in the status 902: "active" if the job is being processed; "normal termination" if the processing has normally terminated; "abnormal termination" if the processing has abnormally terminated; or "cancel" if the processing has terminated by being canceled. Note that recording this information starts only in the case where the job generation unit 452 of the service provider 450 has generated a job in response to a request from the script execution unit 444 of the web browser 440. This information will not be recorded in the case of a job in response to a request from a source other than the web browser 440 (for example, a printing request from a PC or the like).

Figure 9B:
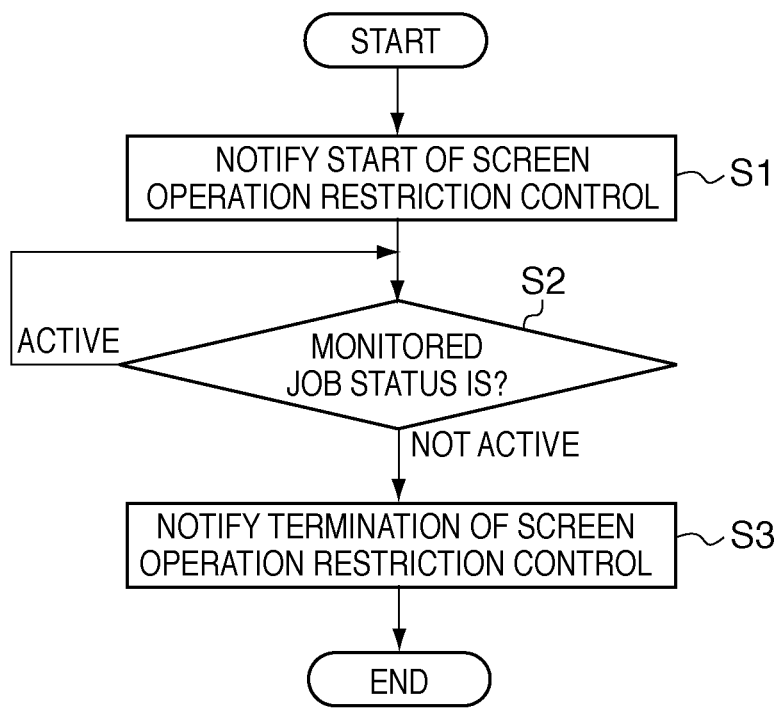
FIG. 9B is a flowchart showing the flow of processing carried out by a job status management unit.

FIG. 9B is a flowchart showing the flow of processing according to the status of a job carried out by the job status management unit 460. This processing starts concurrently with the start of recording job status information shown in FIG. 9A upon the start of a new job. Note that this processing is performed by the CPU 211 executing the program loaded from the HDD 214 into the RAM 213.

First, in S1, the start of screen operation restriction control is notified. This start notification is transmitted from the status notification unit 462 of the job status management unit 460 to the screen operation control unit 445 of the web browser 440. The procedure then proceeds to S2, where the status notification unit 462 monitors the status of the job and stands by as long as determining that the status of the job is "active", and if it determines that the status changes upon the termination of the job processing, the procedure proceeds to S3. In S3, termination of screen operation restriction control is notified according to the determination result of the status. This termination notification is transmitted from the status notification unit 462 of the job status management unit 460 to the screen operation control unit 445 of the web browser 440, as with the case of the start notification.

Figure 10:
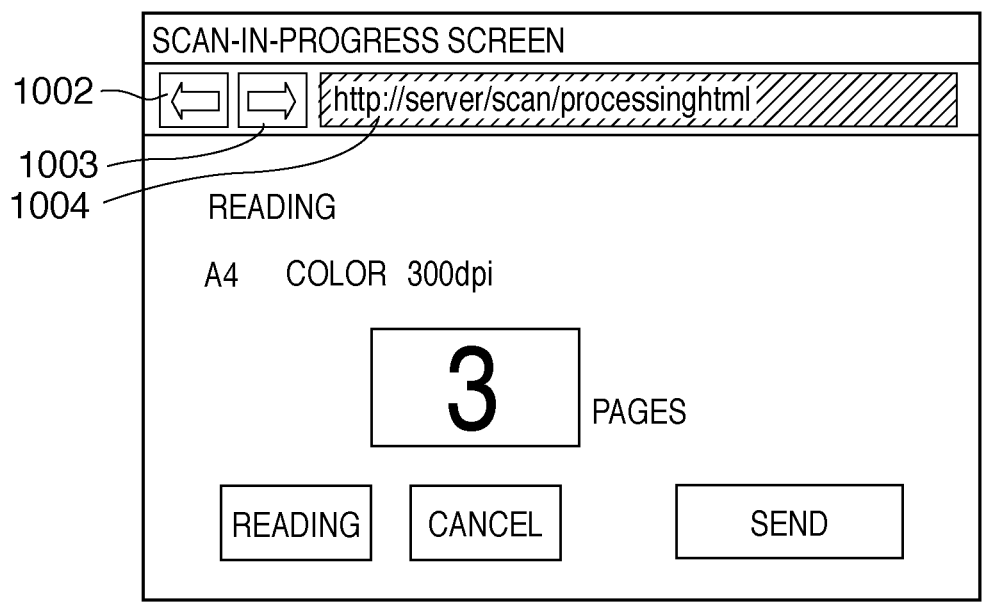
FIG. 10 is a diagram illustrating processing performed by a screen operation control unit upon receiving a notification to start screen operation restriction control.

FIG. 10 is a diagram illustrating processing performed by the screen operation control unit 445 when the start notification of screen operation restriction control is received in S1. Here, although an example of the same screen as that in FIG. 8 is shown, screen transition is prevented by not accepting a screen transition operation from the user with respect to the web browser 440. That is, the screen operation control unit 445 restricts acceptance of an instruction for screen transition given by the user. In the example of the screen in FIG. 8, operations on predetermined areas such as the back button 802, the forward button 803, and the address field 804 are enabled, and the user can operate them. However, in FIG. 10, since operations on all the predetermined areas such as a back button 1002, an forward button 1003, and an address field 1004 is set to a disabled state, even if the user presses any of these buttons, the input is not accepted. Note that although the case where a user operation is disabled by not accepting a user operation on the buttons and the field has been described in FIG. 10, the buttons and the field may be hidden.

As described above, according to Embodiment 1, it is possible to control screen transition by the web browser during job control, and avoid a job that is being processed being retained in the MFP.

Embodiment 2

Next is a description of Embodiment 2 according to the present invention. In Embodiment 2, the case where the processing carried out while a job is being processed differs from that in Embodiment 1 described above is described. Although screen control is performed such that a user operation for screen transition is not accepted as shown in FIG. 10 in Embodiment 1 described above, screen control is performed so as to confirm with the user whether or not to perform screen transition after accepting a user operation in Embodiment 2. Note that since the configurations of the information processing system, the MFP 101, and the web server 102 according to Embodiment 2 are the same as those in Embodiment 1 described above, a description thereof is omitted.

Figure 11A:
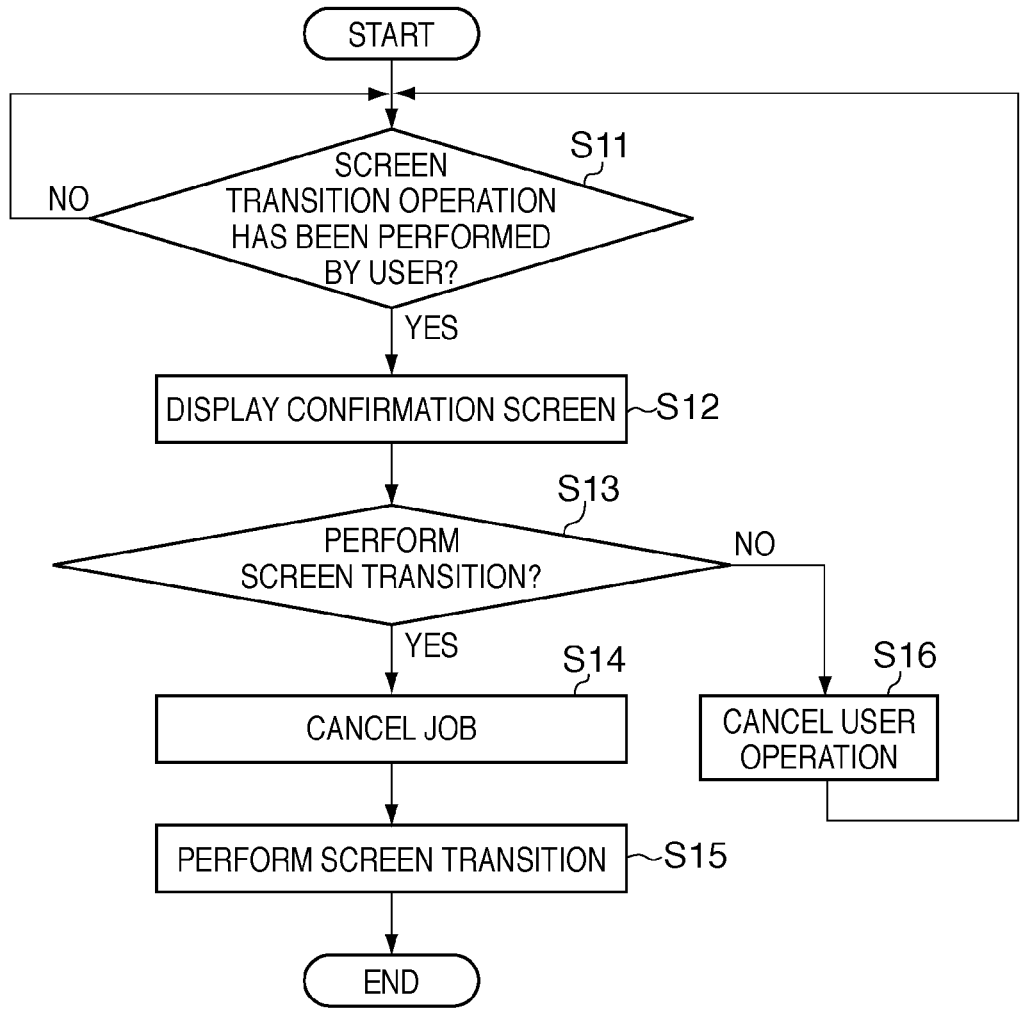
FIG. 11A is a flowchart illustrating processing carried out by the screen operation control unit of the MFP according to Embodiment 2.

FIG. 11A is a flowchart illustrating processing carried out by the screen operation control unit 445 of the MFP 101 while screen operation restriction control is being performed in Embodiment 2. Note that this processing is performed by the CPU 211 executing the program loaded from the HOD 214 into the RAM 213. This processing is executed between reception of the start notification of screen operation restriction control in S1 in FIG. 9B and reception of the termination notification of screen operation restriction control in S3.

First, in S11, the screen operation control unit 445 stands by until a screen transition operation is performed by the user.

Here, if the user performs an input operation on, for example, any of the back button 802, the forward button 803, and the address field 804 in FIG. 8, the procedure proceeds from S11 to S12. In S12, a confirmation screen shown, for example, in FIG. 11B is displayed.

Figure 11B:
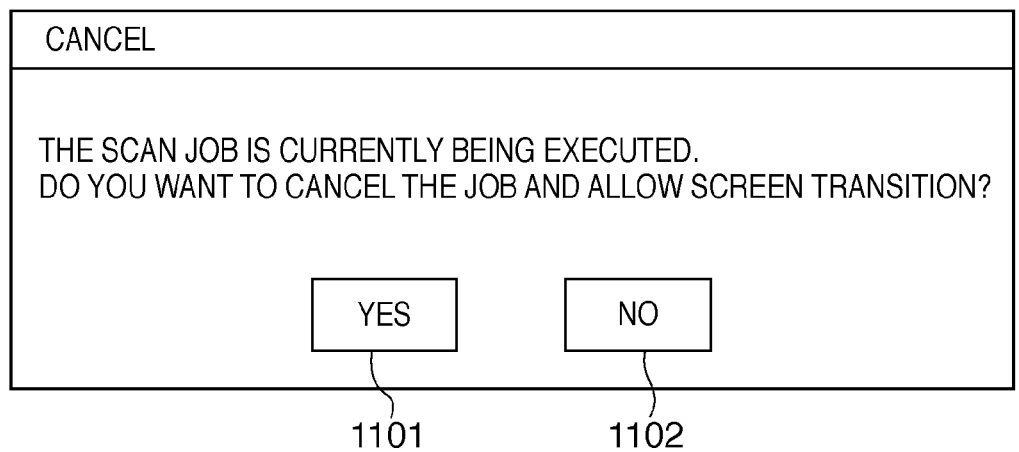
FIG. 11B is a diagram showing an example of a confirmation screen displayed in S12.

FIG. 11B is a diagram showing an example of the confirmation screen displayed in S12. In this example, as confirmation screen display control, a warning is given indicating that since a job is being executed, the job needs to be canceled if screen transition is performed. The user instructs whether or not to cancel the job that is currently being executed and perform screen transition by pressing a "yes" button 1101 or a "no" button 1102.

Then, in S13, the button on which the user has performed the input operation via this confirmation screen is determined. Here, if the user has pressed the "yes" button 1101, the procedure proceeds to processing in S14 since it is an instruction to execute screen transition. On the other hand, if the "no" button 1102 has been pressed, since screen transition is not to be executed, the procedure proceeds to S16. The web browser 440 notifies the job status management unit 460 to cancel the job in S14, and switches to the screen instructed by the user in S15. Further, in S16, the screen transition operation performed by the user is canceled, and the procedure returns to the standby in S11 for a screen transition operation performed by the user.

As described above, according to Embodiment 2, as with the case of Embodiment 1 described above, it is possible to control screen transition by the web browser, and avoid a job that is being processed being retained in the MFP.

Embodiment 3

Next is a description of Embodiment 3 according to the present invention. Embodiment 3 differs from Embodiment 1 in that whether or not to suppress screen transition is judged utilizing more detailed job status, in contrast to Embodiment 1 in which it is judged based only on whether or not the job is being processed. Note that since the configurations of the information processing system, the MFP 101, and the web server 102 according to Embodiment 3 are the same as those in Embodiment 1 above, a description thereof is omitted.

Jobs of the MFP 101 include a job that constantly needs interactive control by the web browser 440 since interactive processing is performed during processing, such as a scan job. Further, there are jobs that do not need to be controlled by the web browser 440 once the MFP 101 starts processing as in the case of jobs, such as printing, e-mailing a scanned image, and transmitting a scanned image to the FTP server, because such jobs are executed using a background-processing function of the MFP 101. In Embodiment 3, the same processing as in Embodiments 1 and 2 described above is performed in the case where a job that needs to be interactively controlled by the web browser 440, that is, processing that uses the web browser 440, is being executed. On the other hand, screen operation restriction control different from that in Embodiments 1 and 2 described above is carried out in the case where a job that can continue to be processed even without interactive control by the web browser 440 is being executed.

FIG. 12A is a diagram illustrating job status information for processing performed by the job status management unit 460 as with the case of FIG. 9A. A job ID 1201 and a status 1202 respectively correspond to the job ID 901 and the status 902 in FIG. 9A. In Embodiment 3, a sub-status 1203 is added to the job status information. In the sub-status 1203, in the case where the job that is currently being executed needs to be interactively controlled by the web browser 440 and thus in the state where screen transition is not allowed, "prohibit" is set. On the other hand, in the case where interactive control by the web browser 440 is not necessary, "permit" is set in the sub-status 1203. Note that if processing of a job terminates, this status is initialized, and nothing is set therein.

FIG. 12B is a flowchart illustrating processing according to the status of a job carried out by the job status management unit 460, as with the case of FIG. 9B. This processing starts concurrently with the start of recording job status information shown in FIG. 12A upon the start of a new job. Note that this processing is performed by the CPU 211 executing the program loaded from the HDD 214 into the RAM 213.

First, in S21, the start of screen operation restriction control is notified. This start notification is transmitted from the status notification unit 462 of the job status management unit 460 to the screen operation control unit 445 of the web browser 440, for which the same processing as the processing described with reference to FIG. 10 in Embodiment 1 or the processing in Embodiment 2 is performed. Next, in S22, the status notification unit 462 monitors the status of a job. If the status notification unit 462 determines in S22 that the status of the job is "active", the procedure proceeds to S23, whereas the procedure proceeds to S26 if processing of the job has terminated and the status thereof has changed to termination. In S26, termination of screen operation restriction control is notified. This termination notification is transmitted from the status notification unit 462 of the job status management unit 460 to the screen operation control unit 445 of the web browser 440, as with the case of the start notification.

If the job is being executed, the procedure proceeds from S22 to S23, where the status notification unit 462 monitors the sub-status 1203 of the job. If the status notification unit 462 determines in S23 that the sub-status 1203 of this job indicates "prohibit", the procedure proceeds to processing in S24, whereas the procedure proceeds to processing in S25 in the case of "permit". In S24, the status notification unit 462 performs sub-status notification so as to perform screen operation restriction control. Accordingly, in this case, screen transition performed by a user button operation is suppressed (prohibited), as with the case of FIG. 10 in Embodiment 1 described above. On the other hand, in S25, the status notification unit 462 performs sub-status notification so as to permit screen transition performed by a user button operation. Note that this sub-status notification is transmitted from the status notification unit 462 of the job status management unit 460 to the screen operation control unit 445 of the web browser 440, as with the case of the start and termination notification.

Figure 13:
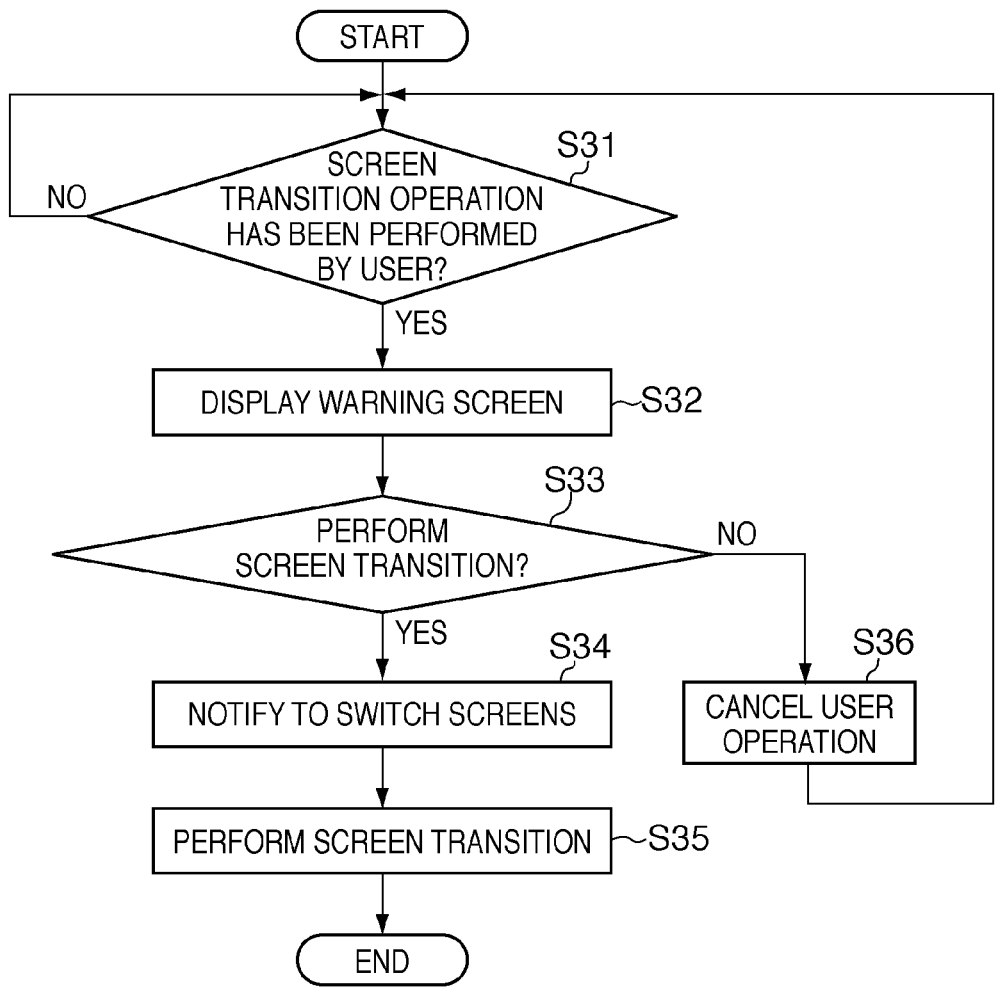
FIG. 13 is a flowchart illustrating processing carried out while the screen operation control unit is executing screen operation restriction control with a sub-status indicating "permit" in Embodiment 3.

FIG. 13 is a flowchart illustrating processing carried out by the screen operation control unit 445 while screen operation restriction control is executed with the sub-status indicating "permit" in Embodiment 3. Note that this processing is performed by the CPU 211 executing the program loaded from the HDD 214 into the RAM 213. This processing is processing until a termination notification of screen operation restriction control is received in S24 to S26 in FIG. 12B. Here, the case is described where screen transition is performed if the user performs operation of permitting screen transition even in the state where screen transition is prohibited, as with the case of Embodiment 2 described above.

First, in S31, the screen operation control unit 445 stands by until a screen transition operation is performed by the user. If the user has performed an input operation on any of the back button 802, the forward button 803 and the address field 804, the procedure proceeds to S32. A warning screen is displayed in S32.

Figure 14:
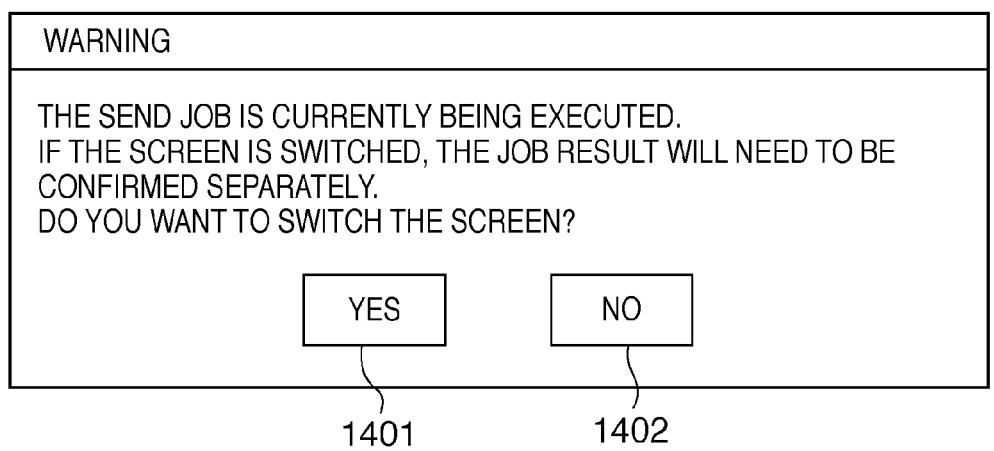
FIG. 14 is a diagram showing an example of a warning screen displayed in S32.

FIG. 14 is a diagram showing an example of the warning screen displayed in S32. This example shows a warning indicating that although it is possible to switch screens, the result of a transmission job needs to be separately confirmed if the screen is switched, since the job is being executed. If the user presses either a "yes" button 1401 or a "no" button 1402 with respect to the question displayed on the warning screen, the procedure proceeds to S33.

In S33, the screen operation control unit 445 determines the button on which the user has performed an input operation via the warning screen. Here, if it is determined that the user has pressed the "yes" button 1401, since it is an instruction to execute screen transition, the procedure proceeds to the processing in S34. If the "no" button 1402 is pressed, screen transition is not to be executed, and thus the procedure proceeds to S36. In S34, the web browser 440 notifies the job status management unit 460 to switch the screen. Then, in S35, switching to the screen instructed by the user is carried out. Note that the job status management unit 460 terminates job monitoring processing shown in FIG. 12B, upon receipt of a screen switching notification. Further, in S36, the user operation of causing screen transition is canceled, and the procedure returns to standby for a screen transition operation performed by the user in S31.

As described above, according to Embodiment 3, it is possible to improve usability by performing more detailed control, in addition to the effects of Embodiments 1 and 2 described above.

Embodiment 4

Next is a description of Embodiment 4 according to the present invention. In Embodiment 4, a description is given with regard to processing in the case where screen transition based on a control script fails while screen operation restriction control is being performed or the web browser 440 is forcibly terminated in Embodiments 1 to 3 described above. Note that since the configurations of the information processing system, the MFP 101, and the web server 102 according to Embodiment 4 are the same as those in Embodiment 1 described above, a description thereof is omitted.

As shown by a series of processes shown in FIG. 5, the web browser 440 transmits an HTTP request to the web server 102 again according to the execution result of a function, obtains a screen and a control script for continuously processing a job, and advances the processing. If an HTTP request to the web server 102 fails due to a certain factor when screen operation restriction control is performed while the job is being executed, the web browser 440 cannot continue the job. Accordingly, the job that is being processed is retained in the MFP 101, and the user operation with respect to the web browser 440 also remains in a prohibited state. Further, the MFP 101 has a function of forcibly terminating the web browser 440 that is currently performing execution, such as a user log-off function. In this case as well, a job that is being processed will be retained in the MFP 101.

Figure 15:
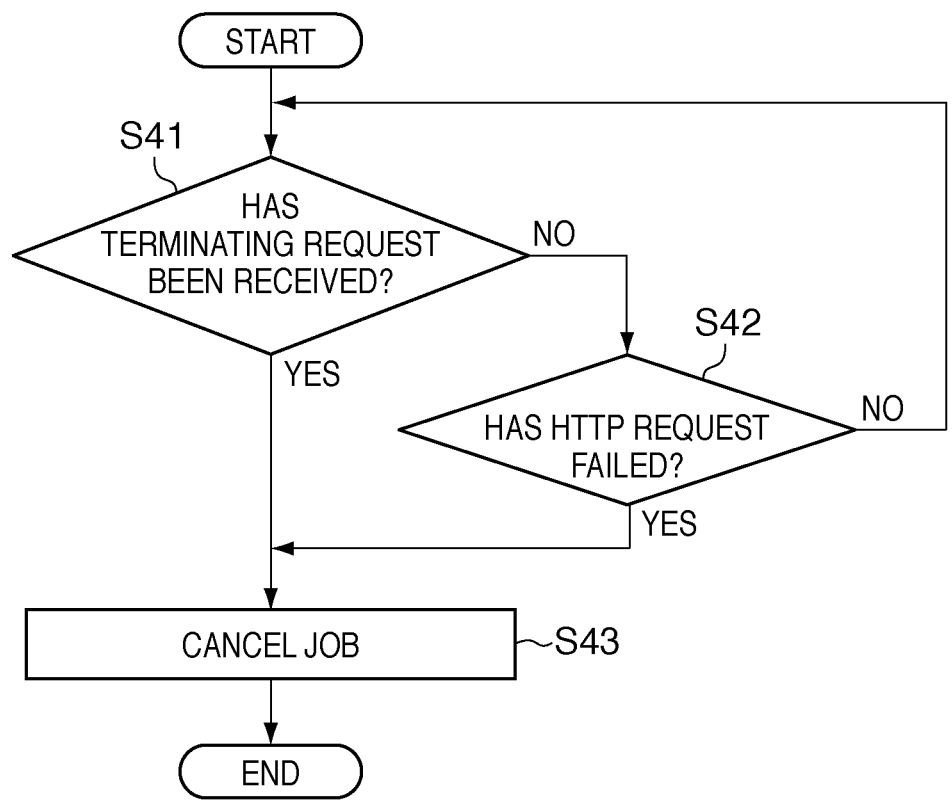
FIG. 15 is a flowchart illustrating processing performed by the web browser while the screen operation control unit is executing screen operation restriction in Embodiment 4.

FIG. 15 is a flowchart illustrating processing performed by the web browser 440 while the screen operation control unit 445 is executing screen operation restriction in Embodiment 4. Note that this processing is performed by the CPU 211 executing the program loaded from the HDD 214 into the RAM 213.

First, in S41, the web browser 440 determines whether or not a terminating request has been received from the MFP 101. If a terminating request has been received, the procedure proceeds to S43, where the job that is being executed is canceled. On the other hand, if a terminating request has not been received in S41, the procedure proceeds to S42, where it is determined whether or not an HTTP request has failed. If it is determined that an HTTP request has failed, the procedure proceeds to S43. If it is determined that an HTTP request has not failed, the procedure returns to the processing in S41. The job is canceled in S43. At this time, the web browser 440 notifies the job status management unit 460 so as to cancel the job.

As described above, according to Embodiment 4, it is possible to appropriately terminate processing even in the case where an HTTP request has failed or the browser is terminated.

Embodiment 5

Next is a description of Embodiment 5 according to the present invention. In Embodiment 5, the case is assumed where the service provider 450 displays on the operation unit 219 a "job-in-progress screen" indicating that a function of the MFP 101 is being executed. Here, the "job-in-progress screen" is a screen such as the scan screen 603 and the transmission-in-progress screen 604 in FIG. 6. In such a case, the following problems may occur in the MFP 101.

If a certain instruction is input by the user operating an operation screen displayed by the web browser 440, the MFP 101 notifies the web server 102 of that instruction. After that, the MFP 101 may cause the operation screen that is being displayed to transition to another operation screen according to the user operation before receiving a request to execute processing according to the instruction from the web server 102.

An example of such a case is that the MFP 101 notifies the web server 102 of an instruction input via the operation screen displayed by the web browser 440, and thereafter closes the web browser 440, and then causes the display to transition to an operation screen provided by another application in the MFP 101. Alternatively, another example is a case where the MFP 101 newly displays an operation screen provided by another application in the MFP 101 in front of the operation screen displayed by the web browser 440 in the state where the web browser 440 itself remains active. In such a case, when processing requested by the web server 102 requires a user operation in the execution of the processing, even if execution of the processing starts, a necessary operation may not be performed by the user in the course of the processing. Consequently, execution of the processing may be pointless. For example, in the case where processing requested by the web server 102 is original reading processing, and image data obtained by the reading processing needs to be confirmed by the user using a preview function, preview cannot be performed if the web browser 440 is not performing display. Consequently, the steps after preview among steps of the processing requested by the web server 102 cannot be executed, and thus the processing that has already been executed will be pointless.

Alternatively, for example, there is a case in which if the user inputs an instruction via the operation screen displayed by the web browser 440, and thereafter causes the operation screen that is being displayed to transition to another operation screen, the request from the web server 102 in response to that instruction reaches the MFP 101 with a delay. In this case, upon starting execution of the requested processing, the MFP 101 displays, based on screen information held by the MFP 101 itself, a "job-in-progress screen" indicating that processing requested by the web server 102 is being executed on the top screen on the operation unit 219. As a result, while the user is operating an operation screen after screen transition on the operation unit 219, a "job-in-progress screen" will be displayed on the top screen, which disturbs the user operation.

Embodiment 5 has a feature that in order to cope with such problems, transition of an operation screen is restricted when processing based on a request from the web server 102 is executed in the MFP 101. Here, whether or not to suppress screen transition is judged based only on whether or not a job is being processed in Embodiment 1 described above. In contrast, in Embodiment 5, the web browser 440 requests the service provider 450 to prohibit screen transition, thereby suppressing screen transition, which is different from Embodiment 1. Note that with regard to the configurations of the information processing system, the MFP 101, and the web server 102 according to Embodiment 5, a description of the aspects in common with the embodiments described above is omitted.

Figure 4B:
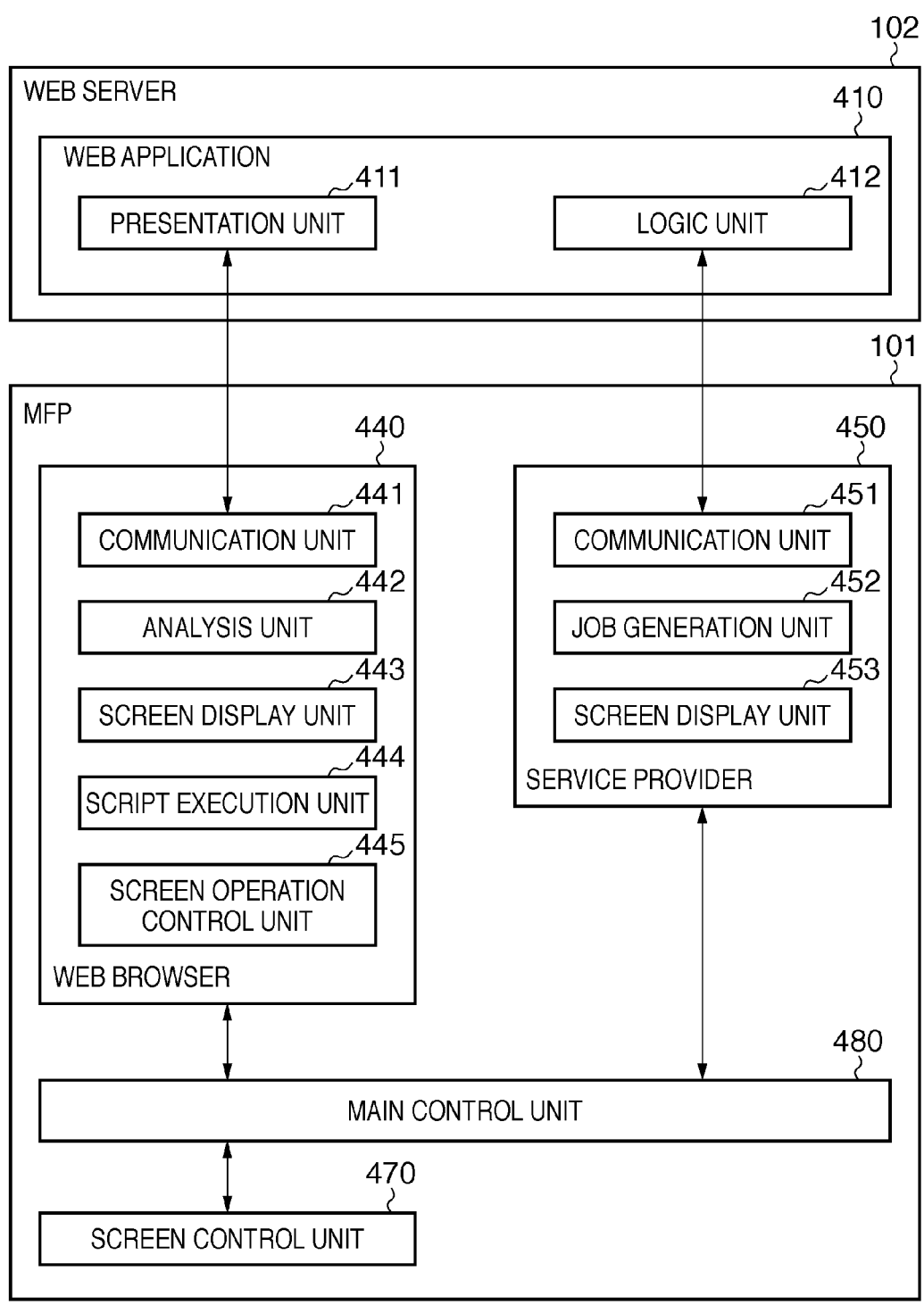

FIG. 4B is a diagram showing the software configuration of the information processing system according to Embodiment 5. The functional units shown in FIG. 4B are realized by the CPU 211 and the CPU 311 included in the MFP 101 and the web server 102 respectively executing the programs loaded in the corresponding RAMs 213 and 313, as with the case of the functional units shown in FIG. 4A. Here, only the aspects different from FIG. 4A are described. A main control unit 480 controls the functional units of the MFP 101. The service provider 450 has a screen display unit 453, in addition to the communication unit 451 and the job generation unit 452. Here, although the screen display unit 443 displays on the operation unit 219 a screen created based on the analysis result of HTML data obtained by the analysis unit 442, the screen display unit 453 displays on the operation unit 219 a screen created based on processing in the service provider 450. A screen control unit 470 controls switching of a screen displayed on the operation unit 219 between the display performed by the screen display unit 443 of the web browser 440 and the display performed by the screen display unit 453 of the service provider 450 via the main control unit 480. Note that in Embodiment 5, since the MFP 101 does not need to judge the status of a job, the job status management unit 460 is not shown in FIG. 4B.

Figure 16:
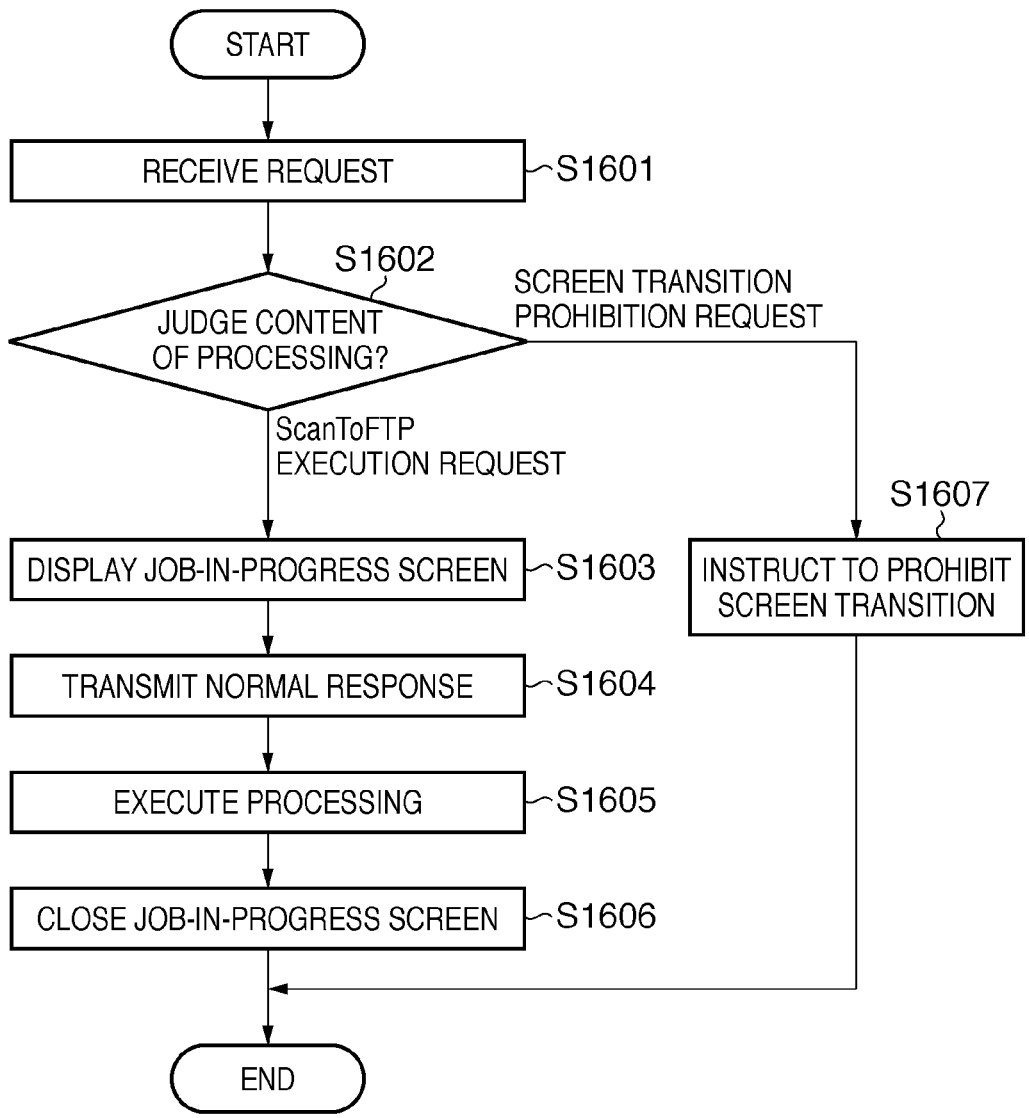
FIG. 16 is a flowchart illustrating processing performed when a service provider of the MFP receives a request in Embodiment 5.

FIG. 16 is a flowchart illustrating a series of processes performed by the service provider 450 of the MFP 101 upon receipt of a request in Embodiment 5. The operations of the steps in the flowchart are realized by the CPU 211 of the MFP 101 executing a control program stored in the HDD 214. Below is a description of the case where the content of processing of a request from the web application 410 of the web server 102 to the service provider 450 is "ScanToFTP".

In S1601, the communication unit 451 of the service provider 450 receives a request from the web application 410 of the web server 102 or a request via local loopback from the web browser 440 in the MFP 101. In response to the reception, in S1602, the service provider 450 judges the content of processing to be executed based on the request received in S1601. Here, the service provider 450 advances the processing to S1607 if it is judged that the content of the processing is prohibition of screen transition by receiving a screen transition prohibition request via local loopback from the web browser 440. In S1607, the service provider 450 instructs the screen control unit 470 to prohibit switching of a screen that is being displayed on the operation unit 219. This processing corresponds to S1703 and S1704 in FIG. 17 that will be described below. For example, even if the user tries to close the display screen displayed by the screen display unit 443 of the web browser 440 and display another screen by operating the operation unit 219, the screen control unit 470 executes control for canceling that operation in response to the above instruction.

On the other hand, if it is judged in S1602 that the content of the processing is "ScanToFTP" due to reception of a "ScanToFTP" execution request from the web application 410, the service provider 450 advances the processing to S1603. In S1603, the screen display unit 453 of the service provider 450 creates a "job-in-progress screen" indicating that "ScanToFTP" is being executed, and instructs the screen control unit 470 to display that screen on the operation unit 219. Here, the screen display unit 453 displays, for example, the scan screen 603 and the transmission-in-progress screen 604 shown in FIG. 6 as the "job-in-progress screen".

Next, the service provider 450 transmits a normal response to the web application 410 in S1604, and thereafter executes processing of "ScanToFTP" in S1605. In S1605, the screen display unit 453 of the service provider 450 may update the "job-in-progress screen" displayed in S1603 so as to show the execution progress. Further, while the processing in S1603 to S1605 is being performed, the user operation via the display screen of the operation unit 219 may be limited to the range of the scan screen 603 or the transmission-in-progress screen 604, and transition to other operation screens may be prohibited. If processing of "ScanToFTP" terminates, the procedure proceeds to S1606, where the service provider 450 closes the "job-in-progress screen", and terminates the series of processes in response to reception of the request.

Figure 17:
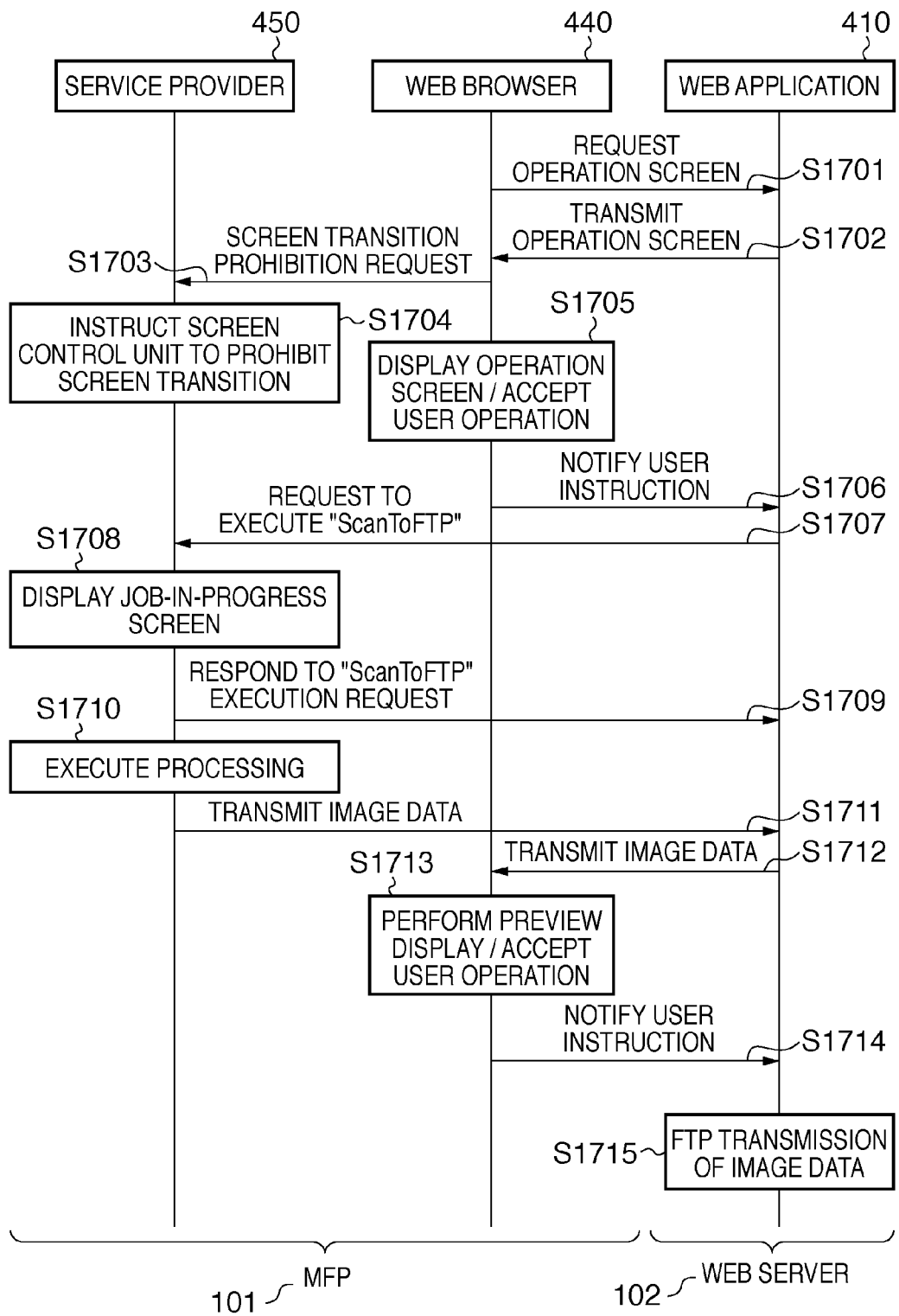
FIG. 17 is a sequence diagram showing the flow of processing in the information processing system according to Embodiment 5.

FIG. 17 is a sequence diagram showing the flow of processing of the entire information processing system including the MFP 101 and the web server 102 in the case where the content of processing requested by the web application 410 is "ScanToFTP".

In S1701, the web browser 440 accesses the web server 102 (the web application 410), in accordance with a URL registered in the web browser 440 in advance or a URL arbitrarily designated by the user, and requests an operation screen. In S1702, the web application 410 that has received the request transmits, as a response thereto, to the MFP 101 (the web browser 440) an HTML file that is screen data for the web browser 440 to display an operation screen on the operation unit 219.

In S1703, the web browser 440 that has received the HTML file transmits a screen transition prohibition request via local loopback to the service provider 450 in accordance with a control script described in the HTML file. In S1704, the service provider 450 that has received the screen transition prohibition request instructs the screen control unit 470 to prohibit screen transition according to the user operation. Accordingly, even if the user inputs an instruction for screen transition via an operation screen after that, the screen control unit 470 performs control so as to cancel the instruction for screen transition until the processing requested by the web application 410 is complete.

Next, in S1705, the web browser 440 displays an operation screen on the operation unit 219 based on the HTML file received in S1702, and accepts the user operation. Here, if the user gives an instruction to execute "ScanToFTP" using the operation screen, the web browser 440 notifies the web application 410 of that instruction in S1706.

In S1707, the web application 410 requests the service provider 450 to execute "ScanToFTP" in response to the received notification. Upon receipt of this request, in S1708, the screen display unit 453 instructs the screen control unit 470 to display, in time with the execution of the processing, the scan screen 603 and the transmission-in-progress screen 604 shown in FIG. 6 as the "job-in-progress screen" (which corresponds to S1603 in FIG. 16). Furthermore, in S1709, the service provider 450 transmits to the web application 410 a normal response to the request received in S1707 (which corresponds to S1604 in FIG. 16). While the processing requested by the web application 410 is being executed, an instruction for screen transition from the "job-in-progress screen" is canceled by the screen control unit 470.

After that, the service provider 450 executes the requested reading processing in S1710 (which corresponds to S1605 in FIG. 16), and transmits image data obtained by the reading processing to the web application 410 in S1711. The web application 410 that has received the image data from the service provider 450 transmits that image data to the web browser 440 in S1712.

In S1713, the web browser 440 displays the image data received from the web application 410 on the operation unit 219 using a preview function, thereby allowing the user to confirm the content of the image data obtained by the reading processing. When the user who has confirmed the content of the image data gives an instruction for execution of transmission of the image data via the operation screen displayed by the web browser 440, the web browser 440 notifies the web application 410 of that instruction in S1714. Upon receipt of the instruction, the web application 410 executes FTP transmission of the image data obtained by the reading processing in S1715. Note that it is assumed that the user has designated the destination of FTP transmission via the operation screen displayed in S1705.

As described above, according to Embodiment 5, the MFP 101 prohibits (cancels) a screen transition operation performed by the user according to the content of a control script provided by the web application 410. That is, if content of processing for a screen transition prohibition request via local loopback is described in the received control script, the MFP 101 prohibits the operation screen displayed on the operation unit 219 by the web browser 440 from transitioning to another operation screen.

Accordingly, it is possible to prevent execution of subsequent processing requested by the control script from being disturbed by switching the screen displayed on the operation unit 219 to another operation screen (for example, by closing the web browser). Further, it is possible to prevent that, for example, in the case where confirming processing needs to be performed on image data generated by reading processing using a preview function, such image data will be retained in the web server 102 by letting the state where the confirming processing is not performed thereon continue. Furthermore, it is possible to prevent the display of the operation screen being operated by the user from being disturbed by displaying a "job-in-progress screen" according to the start of execution of the processing requested by the control script after the operation screen displayed on the operation unit 219 has been switched. Note that although "ScanToFTP" has been described as an example of processing requested by the web application 410 in Embodiment 5, various other types of processing are applicable.

OTHER EMBODIMENTS

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-282223, filed Dec. 11, 2009, and No. 2010-208434, filed Sep. 16, 2010, which are hereby incorporated by reference herein in their entirety.

The invention claimed is:

1. An image reading apparatus having a display unit, comprising:
    a scanning device configured to scan an image on an original document;
    a receiver configured to receive, from a web server, screen data for displaying a plurality of scan screens, and script data for controlling the scanning device; and
    a control unit configured to analyze the screen data by a web browser and to control the display unit to display, in a web browser screen, one of the plurality of scan screens based on an analysis result of the screen data, together with a back button used to perform a user's operation for screen transition to another scan screen that was displayed just before a scan screen that is currently displayed in the web browser screen,
    wherein the plurality of scan screens are displayed in turn in accordance with a user's operation or the screen data, and include a first scan screen on which a start button for causing the scanning device to start scanning of the image is displayed and a second scan screen which is displayed, while the scanning is being executed, for standing-by until a user's subsequent operation is performed,
    wherein the control unit is further configured to i) analyze the script data by the web browser and to control the scanning device to start the scanning of the image based on an analysis result of the script data, in response to a user's operation of the start button on the first scan screen displayed in the web browser screen, ii) when the scanning of the image is started by the scanning device, control the display unit to perform screen transition from the first scan screen to the second scan screen among the plurality of scan screens, and iii) control to enable a user's operation of the back button displayed in the web browser screen while the first scan screen is displayed in the web browser screen, and to disable a user's operation of the back button displayed in the web browser screen while the second scan screen is displayed in the web browser screen.

2. The apparatus according to claim 1, wherein the control unit is further configured to display a warning screen in the web browser screen in response to a user's operation for the back button while the scanning is being executed.

3. The apparatus according to claim 1, wherein the screen data is HTML data.

4. The apparatus according to claim 1, wherein the control unit is further configured to transmit a file corresponding to the image read by the scanning device to a file server based on an analysis result of the script data.

5. The apparatus according to claim 4, wherein the control unit is further configured to set, to the file, a file name which is specified by the script data.

6. The apparatus according to claim 4, wherein the control unit is further configured to generate the file in accordance with a file format which is specified by the script data.

7. The apparatus according to claim 1, wherein the control unit is further configured to permit screen transition of the scan screen after completion of the scanning.

8. The apparatus according to claim 1, wherein the script data is written in Java Script.

9. A control method for an image reading apparatus having a display unit, comprising:
   scanning an image on an original document;
   receiving, from a web server, screen data for displaying a plurality of scan screens, and script data for controlling the scanning device; and
   a controlling step of analyzing the screen data by a web browser and controlling the display unit to display, in a web browser screen, one of the plurality of scan screens based on an analysis result of the screen data, together with a back button used to perform a user's operation for screen transition to another scan screen that was displayed just before a scan screen that is currently displayed in the web browser screen,
   wherein the plurality of scan screens are displayed in turn in accordance with a user's operation or the screen data, and include a first scan screen on which a start button for causing the scanning device to start scanning of the image is displayed and a second scan screen which is displayed, while the scanning is being executed, for standing-by until a user's subsequent operation is performed,
   wherein the controlling step further controls to i) execute scanning of the image based on an analysis result of the script data, in response to a user's operation of the start button on the first scan screen displayed in the web browser screen, ii) when the scanning of the image is started by the scanning device, control the display unit to perform screen transition from the first scan screen to the second scan screen among the plurality of scan screens, and control to enable a user's operation of the back button displayed in the web browser screen while the first scan screen is displayed in the web browser screen, and to disable a user's operation of the back button displayed in the web browser screen while the second scan screen is displayed in the web browser screen.

10. A non-transitory computer-readable storage medium which stores a program for causing a computer to function as an image reading apparatus having a display unit, the program comprising:
   code for scanning an image on an original document;
   code for receiving, from a web server, screen data for displaying a plurality of scan screens, and script data for controlling the scanning device; and
   code for controlling to analyze the screen data by a web browser and to control the display unit to display, in a web browser screen, one of the plurality of scan screens based on an analysis result of the screen data, together with a back button used to perform a user's operation for screen transition to another scan screen that was displayed just before a scan screen that is currently displayed in the web browser screen,
   wherein the plurality of scan screens are displayed in turn in accordance with a user's operation or the screen data, and include a first scan screen on which a start button for causing the scanning device to start scanning of the image is displayed and a second scan screen which is displayed, while the scanning is being executed, for standing-by until a user's subsequent operation is performed
   wherein the controlling code further comprises code for i) executing scanning of the image based on an analysis result of the script data, in response to a user's operation of the start button on the first scan screen displayed in the web browser screen, ii) when the scanning of the image is started by the scanning device, controlling the display unit to perform screen transition from the first scan screen to the second scan screen among the plurality of scan screens, and iii) controlling to enable a user's operation of the back button displayed in the web browser while the first scan screen is displayed in the web browser screen, and to disable a user's operation of the back button displayed in the web browser screen while the second scan screen is displayed in the web browser screen.

* * * * *